United States Patent [19]
Martin et al.

[11] Patent Number: 5,148,155
[45] Date of Patent: Sep. 15, 1992

[54] COMPUTER WITH TABLET INPUT TO STANDARD PROGRAMS

[75] Inventors: Patricia A. Martin, Groton; Jonathan T. Huntington, II, Salem, both of Mass.; J. Michael McNally, Derry, N.H.; David M. Barrett, Tyngsboro; Jean R. Ward, Arlington, both of Mass.

[73] Assignee: Wang Laboratories, Inc., Lowell, Mass.

[21] Appl. No.: 613,324

[22] Filed: Nov. 13, 1990

[51] Int. Cl.$^5$ .............................................. G09G 3/02
[52] U.S. Cl. .................................... 340/712; 340/706; 178/18
[58] Field of Search ............... 340/706, 707, 710, 711, 340/712; 178/18; 382/3, 13; 364/518; 395/163

[56] References Cited

U.S. PATENT DOCUMENTS

| | | | |
|---|---|---|---|
| 4,562,304 | 12/1985 | Ward et al. | |
| 4,587,633 | 5/1986 | Wang et al. | |
| 4,602,286 | 7/1986 | Kellar et al. | |
| 4,639,720 | 1/1987 | Rympalski et al. | 340/712 |
| 4,641,354 | 2/1987 | Fukunaga et al. | |
| 4,730,186 | 3/1988 | Koga et al. | 340/712 |
| 4,839,634 | 6/1989 | More et al. | 340/712 |
| 4,899,136 | 2/1990 | Beard et al. | |
| 4,901,221 | 2/1990 | Kodosky et al. | |
| 4,916,699 | 4/1990 | Ohashi | 340/712 |
| 4,947,156 | 8/1990 | Sato et al. | 340/706 |
| 4,953,225 | 8/1990 | Togawa et al. | 382/3 |
| 4,953,226 | 8/1990 | Matsuyama | 382/3 |
| 4,972,496 | 11/1990 | Sklarew | |

FOREIGN PATENT DOCUMENTS

| | | |
|---|---|---|
| 0254561A2 | 1/1988 | European Pat. Off. |
| 0395469 | 10/1990 | European Pat. Off. |
| WO8911695 | 11/1989 | PCT Int'l Appl. |

OTHER PUBLICATIONS

Brad A. Myers; "Creating Interaction Techniques by Demonstration"; IEEE CG&A; Sep./1987; pp. 51-60.

Nick Baran; "Agilis Hand-Held Workstations: Computing Power in the Field"; Byte Aug. 1989; pp. 91-94.

Apple Computer, Macintosh Plus Owner's Guide, 1987, pp. 72-73, 148-149.

Fisher, "New Computer Reads Handwriting", New York Times, Sep. 28, 1989.

(List continued on next page.)

*Primary Examiner*—Ulysses Weldon
*Assistant Examiner*—M. Fatahiyar
*Attorney, Agent, or Firm*—Michael H. Shanahan; David N. Caracappa

[57] ABSTRACT

A computer system having a digitizing tablet overlaying the display screen. The tablet serves as a user's primary input device. Various features of the system make it possible for the user to run and interact with standard programs designed for keystroke and mouse input and not designed for use with a tablet. In addition to the main processor, on which the user's programs are executed, there is an interface processor. In addition to a standard display buffer, there is an ink plane buffer for interface display data that is combined with the data from the standard display buffer on a pixel-by-pixel basis according to data from a mask plane buffer. The interface processor manages input from the tablet, presents feedback to the user by means of the ink and mask planes, and provides keystroke and mouse data to the main processor as if from a standard keyboard controller. The interface processor presents the user with a collection of simulated devices, including standard devices such as a keyboard and a mouse. A nonstandard simulated device performs character recognition, permitting handwritten characters to be used for program input. During interaction with one of the user's programs, the user can activate and deactivate simulated devices (by removing them from and returning them to a device tray) and can make adjustments in their operation and location on the screen.

6 Claims, 12 Drawing Sheets

OTHER PUBLICATIONS

Microsoft Corp., "Microsoft Windows Desktop Applications User's Guide", pp. 63-67, in Microsoft Windows User's Guide, Version 2.0, 1987.

Schmeupe, "A Pair of Digitizing Tablets", Macworld, Mar. 1987, pp. 144-145.

Ward & Philips, "Digitizer Technology: Performance Characteristics and the Effects on the User Interface", IEEE Computer Graphics and Applications, Apr. 1987, pp. 31-44.

Berlis & Borden, "Building a Better Mouse", MACUSER, Oct. 1989, pp. 124-139.

Patent Abstracts of Japan, vol. 14, No. 352(P-108), 30 Jul. 1990.

IBM Technical Disclosure Bulletin, vol. 19, No. 7, Dec. 1976.

T1 T2 T3 T4 T5 T6 T7 T8 T9 T10 T11 T12 T13 T14 T15 T16

DISPLAY TOP HALF

B1 B2 B3 B4 B5 B6 B7 B8 B9 B10 B11 B12 B13 B14 B15 B16

DISPLAY BOTTOM HALF

FIG. 7

COMPUTER WITH TABLET INPUT TO STANDARD PROGRAMS

CROSS-REFERENCES TO RELATED APPLICATION

This application is related to the following applications:
COMPUTER WITH SEPARATE DISPLAY PLANE AND USER INTERFACE PROCESSOR, Barrett, et al., filed Nov. 13, 1990 (the same day as the present application), U.S. Ser. No. 07/613,325;
USER INTERFACE HAVING SIMULATED DEVICES, Ward, et al., filed Nov. 13, 1990 (the same day as the present application), U.S. Ser. No. 07/613,416; and
SYSTEM CLOCK SPEED CONTROLLER, David Barrett, et al., filed Nov. 9, 1990, U.S. Ser. No. 07/611,990.

The first two of these cases are based on the same disclosure as in the present case.

FIELD OF THE INVENTION

The present invention relates to the operation of and supporting facilities for user interfaces for computer systems. The invention is particularly useful in systems where a stylus is the user's primary input device.

BACKGROUND

Driven both by the needs of users and the capabilities of various implementation technologies, computers and the ways that people interact with them are redesigned again and again.

In doing so, it is desirable to optimize the design of each system according to the current technology and current understanding of human factors. However, another, often opposing, force shaping the design of computer systems is the need for new systems to be capable of utilizing pre-existing components, both hardware and software. This force flows from various sources, including the desire to continue to exploit large investments in pre-existing designs, and the desire to use new systems in environments that continue to be populated with pre-existing systems.

It is particularly advantageous for a new system to be able to utilize pre-existing software components, both application programs (programs that adapt a system to address real world tasks—often, referred to simply as "applications") and system programs (providing system management functions and services used by application programs). Because some pre-existing applications have become de facto standards within certain user communities, it is of particular importance that a new system be able to run these standard applications.

Most software that provides for user interaction, is designed for primary user input in the form of keystroke data. A growing body of software, especially that designed for desktop systems, accepts input from a mouse, in addition to keystroke data; generally, these systems still require keystroke data for certain functions.

To make computer systems easier for people to use, various systems have included stylus-type input devices (typically used with a digitizing tablet). Because of their similarity to conventional writing implements, stylus-type devices are, among pointing devices, particularly well suited to be used for character input, in addition to functioning as a pointing device. When used, stylus-type input devices have generally been provided in addition to a keyboard. In some cases, systems have been designed with a stylus-type device as the primary user input device.

A keyboard has characteristics that differ radically from those of a stylus and digitizing tablet. With a keyboard, precise character identification is straightforward: a user generates data representing alphabetic characters simply by pressing corresponding keys. Because a keyboard can be used to create a character with a single event (i.e., press of a binary switch), all the feedback to the user that is needed is display of the character and perhaps accompanied by an audible click. In contrast, while a stylus can be used for character input, very different feedback to the user is required. Handwritten characters are generated by a process that (although familiar to a user) is much more complex, both for the user and for the computer system.

For making function selections with a keyboard, a wide range of alternative approaches are used; of these, pointing to a visible representation of a function or object to be manipulated is awkward, because a keyboard is a very poor pointing device.

A mouse is often used in systems that permit a user to use the mouse to drag objects on the screen. This is accomplished by providing display of a particular type of mouse cursor or pointer: this cursor has an absolute location known to the system, and the system adjusts the cursor's location according to relative movements of the mouse; this cursor functions as an absolute intermediary between the relative movements of a mouse and the object drag operations.

If programs designed to use a mouse cursor are used with a stylus that operates directly on the display screen, the user might expect to be able to directly manipulate the cursor with the stylus, i.e., by placing the stylus over the cursor and dragging it. Typically, this works in a way that users are likely to find frustrating: the relationship between an amount of mouse movement and the distance moved by the cursor is not fixed; this may vary from application to application or even vary within a single application (e.g., it may be a function of velocity); as a result, although the stylus may start on the object, the object will not track the position of the stylus.

In a system in which a stylus is used, it is particularly advantageous for the user to be able to use the stylus directly with the display. For example, it should be possible to write directly on the display screen, and, when appropriate, a trail of "ink" should appear on the display in the path taken by the stylus, thus appearing to a user much like writing on paper.

A pointing-type input device to be used directly on a screen should provide its absolute position (so that the ink appears on the screen at the location of the stylus). This differs from the input provided by a mouse, which provides relative position: with a mouse, the user can generate mouse data indicating nothing but a series of rightward movements, and still have the mouse end at its starting location (e.g., move a mouse to the right, pick up the mouse, place it to the left of its original position, and move the mouse to the right to return to the original location). Thus, although both a mouse and a stylus are "pointer-type" devices (locators), their characteristics differ.

The input of character codes presents another type of impediment to running pre-existing (non-stylus) programs with a stylus. Input of handwritten characters is a sufficiently complex as to require feedback to the user. Yet a program not contemplating handwritten input will have defined a user interface with no provision for such feedback.

These differences in input device characteristics are major impediments to effective utilization of much existing software with a stylus-based computer system. As result, the practice has been that most of the uses of stylus-based input have relied upon application programs written specifically for a system that includes a stylus.

A system built according to the present invention can run pre-existing software and permits a user of the system to use a stylus to interact with such software.

SUMMARY OF THE INVENTION

A system according to the present invention provides for user programs with a pointer-type device (in paticular, a stylus/tablet) that the pre-existing programs were not designed to accommodate. This is accomplished by providing a user interface that logically overlays, but does not interfere with, the operation of the pre-existing program. This user interface provides the user with feedback concerning operation of the pointing-device.

This separate user interface presents to a user a set of simulated devices. Each of these is operated by the user as a separate input device, similar to how the user might treat the various input devices with which the user may already be familiar, although these devices have no physical existence independent of the computer system on which their manifestations are displayed. For example, a simulated mouse device is available to a user; the user observes mouse pad and button areas on the display and operates the simulated mouse device by means of the system's pointer-type device (e.g., stylus).

In order to effect this overlaying interface without interfering with the execution of the pre-existing program, an interface processor is provided to execute software used in implementing this interface. Further, a separate display plane is provided that is visually combined with the display from the pre-existing program, without modifying the display buffer used by the pre-existing program. This display plane is effected by use of an ink plane buffer to hold the image to be combined, a mask plane buffer to indicate how the ink plane data is to be combined with the display data from the pre-existing program, and a multiplexer that performs the data combination.

BRIEF DESCRIPTION OF THE DRAWING

The invention is pointed out with particularity in the appended claims. The above and other advantages of the invention may be better understood by referring to the following detailed description in conjunction with the drawing, in which:

FIGS. 7, 8, and 9 illustrate the correspondence between pixel locations on the display screen and the storage of ink and mask data. FIG. 7 shows some of the pixel locations on a display screen. FIG. 8 has four memory maps showing how the ink and mask data is stored in four VRAM chips. FIG. 9 shows how the ink and mask data appears in the address space of the interface processor.

DETAILED DESCRIPTION OF AN ILLUSTRATIVE EMBODIMENT

1 Platform

1.1 The Computing Environment

The invention is advantageously used in a computer system with which the user interacts by use of a writing stylus or other pointing device. When the user can write on the display, the keyboard is eliminated (or at least made optional), and the computer system is made compact, the resulting system is sometimes referred to as a "notebook" computer. The present invention will be described in the context of such a notebook computer. Based on this description, other embodiments of the invention will be apparent.

Figure 1:
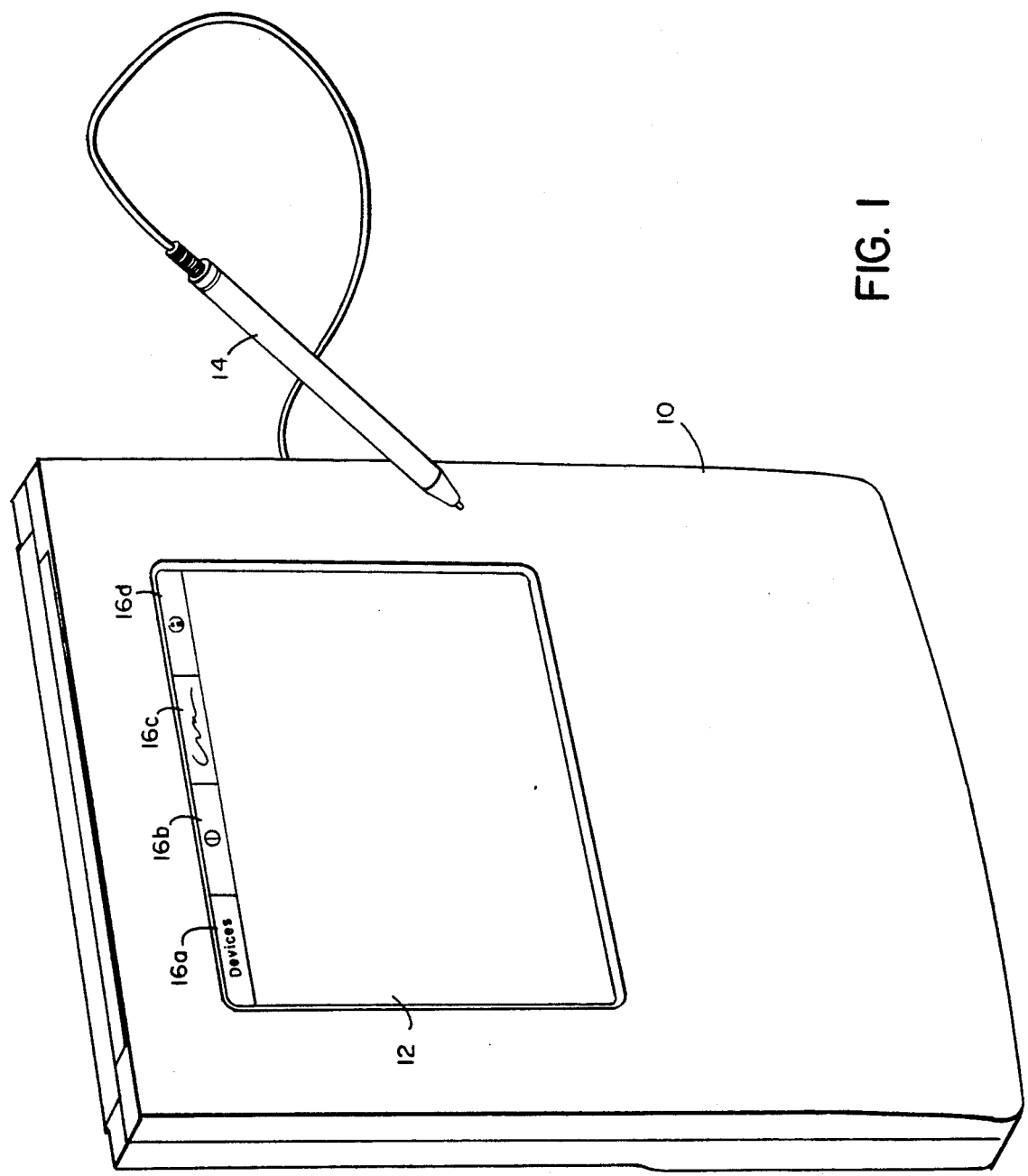
FIG. 1 is a perspective drawing of a computer system in which the present invention is advantageously employed.

FIG. 1 is a perspective drawing of a notebook computer 10. It includes a combination digitizing tablet and display 12. A stylus 14 operates in conjunction with the digitizing tablet to provide X-Y coordinate input to the system. The display is implemented using liquid crystal technology; a backlight is provided. Along one edge of the tablet area are a series of labeled areas 16a, 16b, 16c, and 16d; the system is responsive to stylus touches in these areas to initiate certain system functions. In certain modes of operation the system operates so as to provide electronic ink, in which case movement of the stylus on the tablet leaves a trail visible on the display, as if the user was writing on a piece of paper.

Other features of this illustrative notebook computer include: voice digitizing and playback (a headset/microphone can be plugged in), data communications (including FAX), internal hard disk drive, standard serial and parallel ports, a SCSI port (for connection, among other things, to an external floppy disk drive). Instead of the SCSI port, a connector can be provided to connect to a bus compatible with the micro channel of many of IBM's PS/2 computers.

The main processor is an Intel 80386SX. The core of the system is generally compatible with IBM's PS/2 Model 80, Type 1.

Those aspects of the circuitry that are most closely related to the present invention are described below, including the interface processor, the ink/mask plane portion of the display control, and an ASIC (referred to below as the optimizer) that provides various support logic.

1.2 Major System Components

Figure 2:
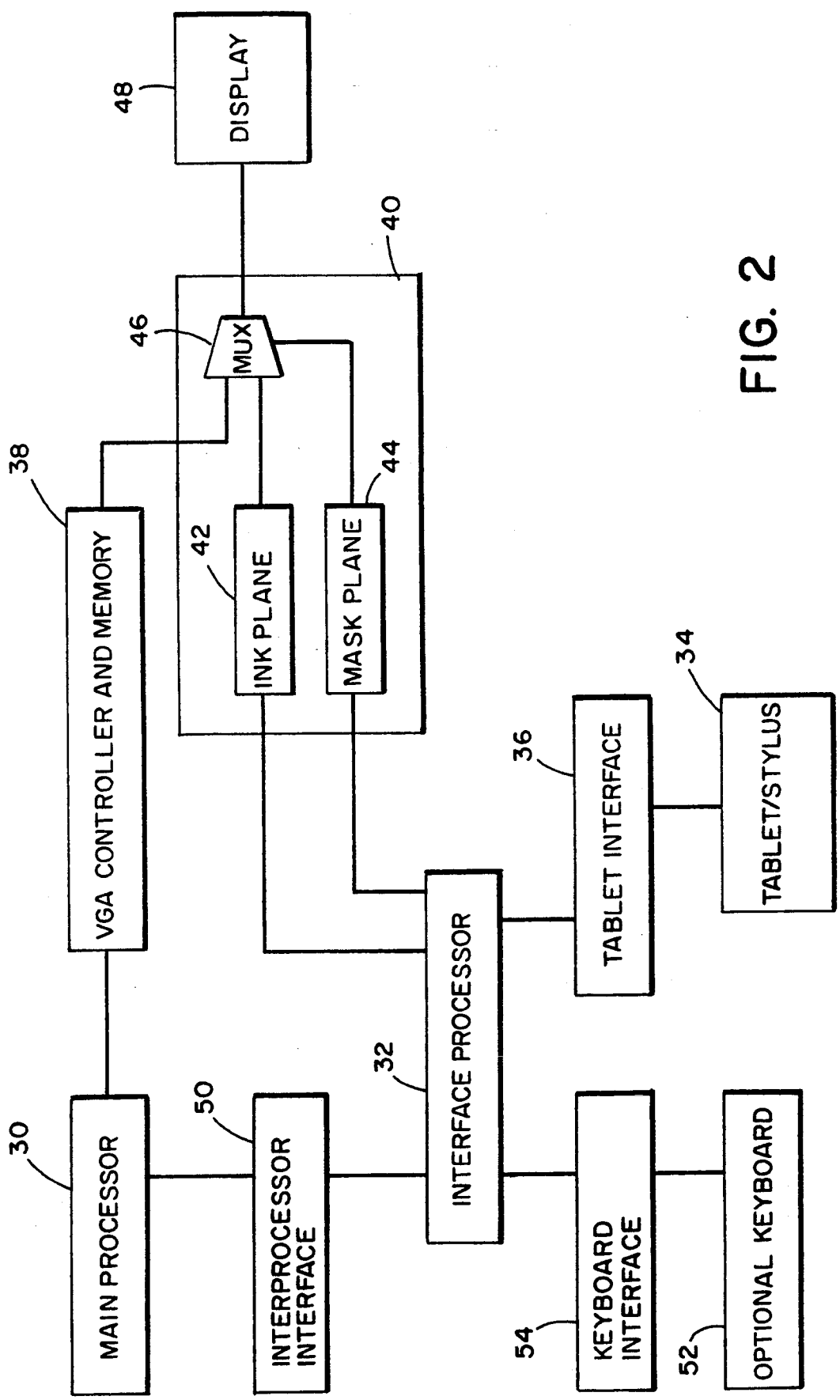
FIG. 2 is a block diagram, emphasizing logical organization, of circuitry of a computer system embodying the present invention.

The major hardware components of the computer system are illustrated in FIG. 2:
main processor 30, interface processor 32,
pointing device (tablet/stylus 34 and interface 36),
main display buffer and controller 38,
display control circuitry 40, including ink plane buffer 42, mask plane buffer 44, and video multiplexer 46,
display screen 48,
interprocessor interface 50, and
optional keyboard 52, connected to the interface processor 32 by interface circuitry 54.

Figure 3:
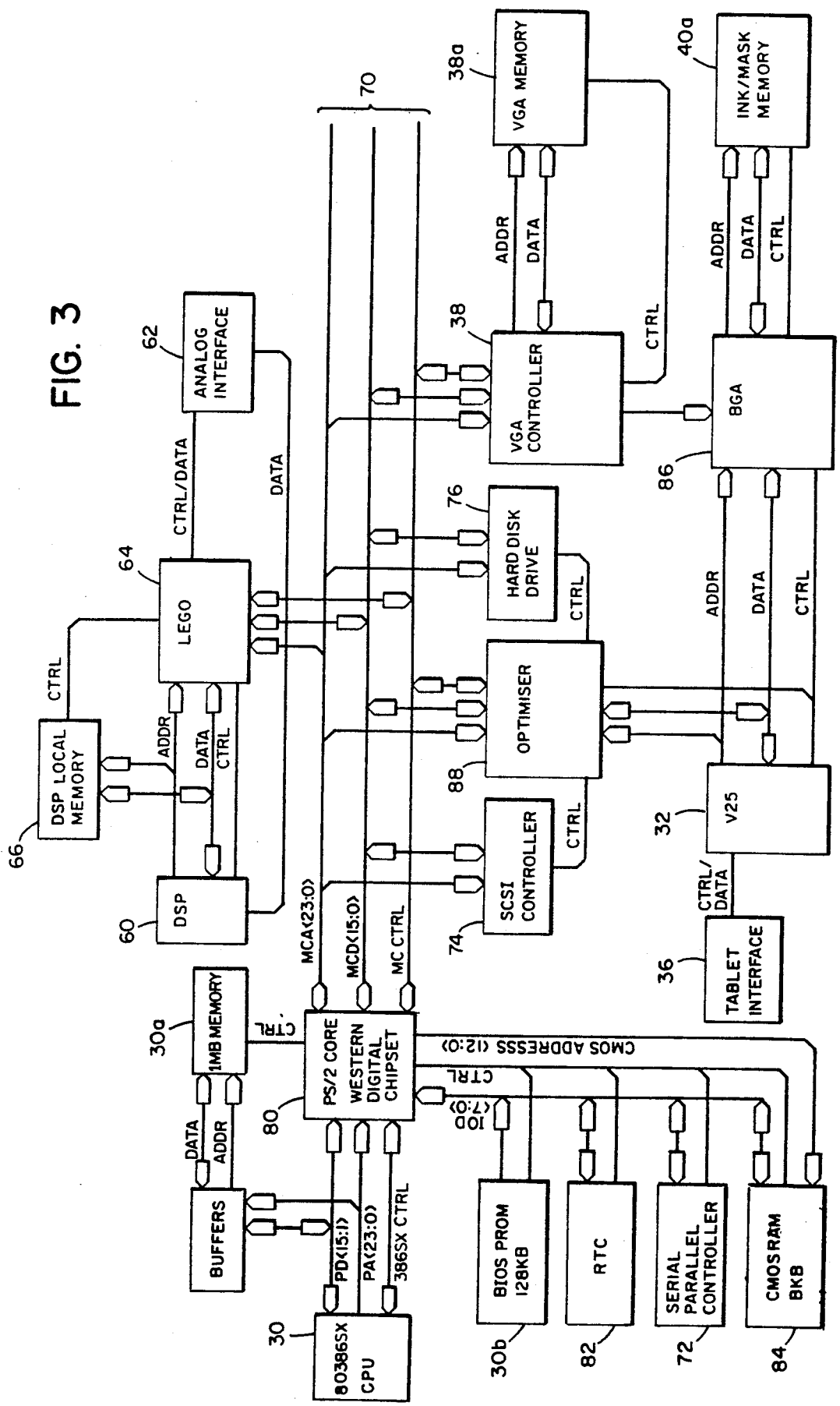
FIG. 3 is a block diagram, emphasizing physical implementation, of circuitry of a computer system embodying the present invention.

FIG. 3 is a block diagram of the computer system that emphasizes the physical implementation of the circuitry, much of which is implemented in specialized large scale integrated circuit chips.

1.2.1 Main Processor

The main processor 30 is implemented using an 80386SX microprocessor, from Intel Corporation. This processor executes the operating system and application programs. There is 1 or 4 Mbyte of base main memory 30a for this processor, with the option of adding two 1 Mbyte or 4 Mbyte modules (thus, providing up to 12 Mbytes). In keeping with the portable nature of the notebook computer, the main memory uses pseudo-static memory chips controlled in a way similar to that described in U.S. Pat. No. 4,710,903. There is 128 Kbytes of memory 30b (ROM) for certain system service software known as the basic input/output system (BIOS).

1.2.2 Display Screen

Visual output is provided by a display screen 48. In the preferred embodiment, this is a flat panel display that is physically integrated with a digitizing tablet 34 (described below). In particular, it is a liquid crystal display with 640 by 480 pixels and having a switching time of 250 milliseconds or better.

1.2.3 Main Display Buffer and Controller

The main display buffer and display controller 38 (Chips & Technologies 82C455 VGA controller) are controlled by the main processor 30. This appears to the applications running on the main processor as a conventional video display, such as is commonly known as VGA. This provides for control of 640 by 480 pixels, which are stored in four 128 K by 8 bit pseudo-static memory devices. This memory, is large enough to work with applications written for 256 colors. Although the pixels of the display screen are binary, the VGA controller time multiplexes these to simulate 16 levels of gray.

1.2.4 Interface Processor

The interface processor 32 is a V25 microprocessor, available from NEC Electronics Inc. The V25 is similar to Intel's 80188. This processor performs the following functions:
connects to main processor and simulates (down to the hardware level) a keyboard controller of the type in a PS/2-type computer. This protocol provides for data from an auxiliary device, typically a mouse. In addition to the keyboard port, another communication channel to the main processor is used for other communications.
connects to the optional physical keyboard and provides this keyboard data to the main processor (as would an 8042 controller in a PS/2-type computer).
connects to and provides data to the ink and mask planes.
runs a simulated devices user interface that uses the tablet input, simulated keyboard port output, and writes to the ink and mask planes.
runs a handwriting recognition algorithm (a part of the simulated devices interface).

1.2.5 Interface Processor Firmware

There is 16 Kbytes of ROM in the V25. This ROM includes program code for initialization, diagnostics, support of data transfer from the main processor to the interface processor's main memory (which includes the buffers for the ink and mask planes), and keyboard controller emulation (permitting use of the physical keyboard prior to download of any software into the interface processor's main memory).

The diagnostics test the interface processor's memory, the data bus connecting the interface processor to the optimizer, and the serial port (including obtaining the status of the tablet that is connected to the serial port).

1.2.5.1 Keyboard Controller Emulation

The firmware provides the functions typically provided by an 8042 keyboard controller. In addition to passing keystroke and mouse data to the main processor, these functions include installing and testing passwords, reading and writing "8042 RAM", and enabling, disabling and testing the physical keyboard interface.

The firmware services that send data to the main processor across the keyboard port can deal with data being sent in three ways: translated data, untranslated data, auxiliary data.

Translated data is handled as coming from a physical keyboard. This data is monitored for changes that affect the shift state of the system as perceived by the interface processor. This data may be translated from one scan code to another, depending upon the status of the PC compatibility bit of the 8042 command byte.

Untranslated data is sent to the system without change. Untranslated data is not monitored for changes in shift state; the interface processor assumes that any changes in the shift state due to the untranslated data will be undone by the end of the stream of untranslated data.

Auxiliary data is sent to the main processor without translation. In sending auxiliary data, a bit of the keyboard status register is set, indicating to the main processor that the data is auxiliary data, rather than keyboard data. Auxiliary data is typically mouse data.

1.2.5.2 Services for Simulated Devices

The firmware provides a variety of services to support the use of the keyboard port by simulated devices.

There are services to disable and enable the flow of data from a physical keyboard. When a disable is requested, the service waits until the stream may be interrupted without splitting any multibyte keycodes, and then returns with an indication of the current shift state.

The submit buffer service provides for the submission of a block of "keyboard" data to be sent. The data is identified as translated, untranslated, or auxiliary, and is treated accordingly. A pointer to a "when done" routine is provided along with the block of data; the service executes this routine when the data in the buffer has been sent. An error is returned if anther buffer is currently being sent. If the physical keyboard is enabled, the submit buffer service will effect a disable physical keyboard before buffer transmission and an enable physical keyboard after data transmission.

An abort buffer service is provided to permit a buffer transmission in progress to be canceled.

A set buffer transmit rate service is provided to control the rate at which buffers of keystroke data are sent to the main processor. This is provided to control against overflow of the keyboard buffer in the main processor. This delay does not apply to buffers of 8 bytes or less; this permits the byte string for any single keystroke to be sent without delay.

A service is provided to control the clock speed of the interface processor. This clock can be set to 2, 4, or 8 MHz. The hardware supporting this speed control is integral to the V25 chip.

A service is provided that will wait for an event from the interface processor serial port (connected to the tablet), an event from the datalink, or a period of time (specified by the caller in milliseconds). The service can wait for any combination of these three events. While waiting, the service will set the speed of the interface processor to its slowest speed. When the event occurs, the service restores the interface processor's speed to its original value and the service returns to the caller.

A service is also provided so that it is possible to chain interrupt vectors to learn about communications from the system to the keyboard or auxiliary device.

The firmware also provides a free-running 32-bit counter. This counter is incremented once each millisecond. It is also possible to chain to these one millisecond interrupts.

1.2.5.3 Datalink Control

The firmware also provides some of the support for communication over the datalink. This communication is described below.

1.2.6 Pointing Device

Preferably, the pointing device is of a type that provides absolute location (e.g., digitizing tablet, light pen). A mouse typically provides relative location (i.e., movement, not position); a mouse could be used, but with less advantage.

The pointing device of the preferred embodiment is a transparent digitizing tablet and its associated stylus (tablet and stylus together are illustrated in FIG. 2 as 34), such as available from Scriptel Corporation.

An appropriate tablet should have characteristics such as the following:

Absolute accuracy should permit pointing to a single pixel in the underlying display; for an underlying display with 100 pixels/inch, this means that total errors from all sources must be less than +/−0.005 inch.

Because the tablet overlays the display, it must be transparent, light diffusion should be minimal, and height of the writing surface over the display should be minimized to reduce visual parallax.

The tablet should be abrasion resistant, so as to withstand use of the stylus as well as impact and abrasion from other objects.

The tablet must have sufficient noise immunity to operate accurately in close proximity to the display and to other RFI sources within the computer.

The small size of a notebook-type computer makes it particularly useful as a portable device; thus, low power is also a useful characteristic.

The tablet should be able to digitize at least 120 points per second.

There should be provision for sensing proximity of the stylus to the tablet so that the system can display a tracking cursor when the user is not writing or dragging, but the stylus is near or on the surface; "touching" the tablet should be sensed, and this can be implemented by a tip switch. The switch force should be such that a user can comfortably write with minimal skipping.

An article titled "Digitizer Technology: Performance Characteristics and the Effects on the User Interface" (*IEEE Computer Graphics and Applications*, April 1987, pp 31-44) describes digitizer technology.

A tablet interface 36 transfers X-Y coordinate data from the tablet to the interface processor. This interface includes an analog front end, a D/A converter, a 68HC11 microcontroller (from Motorola Corporation) and associated logic, and a PROM. The PROM contains information that is used by the microcontroller to correct the raw tablet data. The microcontroller has a serial link to the interface processor 32.

The connection between the tablet interface 36 and the interface processor 32 is a bidirectional, asynchronous serial link operating at 19.2 Kbits/second. The following are the most important of the commands that the interface processor can send to the tablet controller:

Reset

The tablet is reinitialized and tested; success or failure codes are returned to the interface processor.

Quit

The tablet controller powers down as much of the tablet electronics as possible and waits for a new command.

Sleep

The tablet controller stops sending data until a user event occurs (e.g., stylus comes into proximity, or, if already in proximity, the stylus moves), at which time the tablet controller starts sending data.

Other commands can be used for diagnostic purposes.

For each digitized point the tablet controller sends five bytes of data, where the bit positions have the following meaning:

|   | 7 | 6 | 5   | 4    | 3  | 2  | 1  | 0    |
|---|---|---|-----|------|----|----|----|------|
| 1 | 0 | 1 | TIP | SIDE | 0  | 0  | 0  | PROX |
| 2 | 0 | 0 | X5  | X4   | X3 | X2 | X1 | X0   |
| 3 | 0 | 0 | X11 | X10  | X9 | X8 | X7 | X6   |
| 4 | 0 | 0 | Y5  | Y4   | Y3 | Y2 | Y1 | Y0   |
| 5 | 0 | 0 | Y11 | Y10  | Y9 | Y8 | Y7 | Y6   |

PROX indicates whether the stylus is within sensing range of the tablet. TIP indicates whether the tip switch is depressed. SIDE indicates whether the switch on the side of the stylus is depressed. X and Y represent the X-Y coordinate data.

The data sent by the tablet controller to the interface processor has the values 0 to 4095 for the X and for the Y axes. These values correspond to an area slightly larger than the display (to provide for "buttons" along the edge of the display).

A 3-point calibration is done for each unit as part of the manufacturing process (to correct for misalignment of the digitizer and the display) and stored in stable memory (e.g., disk, battery-backed CMOS RAM, EE-ROM). The calibration parameters are used by the interface processor to convert the 12-bit tablet data to display coordinates.

1.2.7 Ink/Mask Display Buffer and Controller

The mask plane has one bit per pixel. It is used to determine (on a pixel-by-pixel basis) whether the data from the normal display buffer or data from the ink plane is shown on the display screen. The mask plane could be extended to include more than one bit per pixel; for example, this would permit selection among a set of image combining arrangements, such as AND, OR, XOR, NOR, and NAND, in addition to simply selecting between the VGA and ink data.

In the illustrative system, the ink plane has one bit per pixel. However, this plane could have more bits per pixel, to permit the ink plane to provide gray scale or color display.

1.2.8 Video Multiplexor

The video multiplexer controls the flow of refresh data to the display. It selects pixel values from the application plane (VGA) data stream or from the ink plane data stream depending on the value of pixel values the mask plane data stream. More complex operations for combining the data from the two planes could be used, such as XOR. Such operations could be selected for the display as a whole, or (if the mask plane included more than one bit per pixel) on a pixel by pixel basis.

1.2.9 Signal Processing Subsystem

The system includes a signal processing subsystem. This subsystem provides for recording and playback of audio, operates as a facsimile modem, and operates as a V22 bis 2400 bit per second modem for data communications. This subsystem includes a digital signal processor 60 (Texas Instruments 320C25) (with its own memory 66), analog circuitry 62 for interface to the outside world, and an ASIC 64 with digital circuitry to tie it together and to the rest of the system (via micro channel 70).

Connectors are provided for an external microphone and headset. An internal microphone is also provided.

1.2.10 Various Communication Ports

Additional communication ports are provided:
2 serial ports (1 having a standard connector, 1 available via the modem port connector, for use when the modem is not needed);
a SCSI port 74;
an industry standard parallel port;

The parallel port and the standard serial port are implemented using a VL16C451B (from VLSI Logic) 72. The second serial port is implemented by the ASIC 64 that is part of the digital signal processing subsystem.

1.2.11 Mass Storage

A hard disk drive 76 is provided for mass storage of programs and data. An external floppy disk drive can be connected via a SCSI interface.

1.3 VLSI Implementation

The following chips, available from Western Digital, implement core logic 80:
WD6000 peripheral I/O controller,
WD6010 DMA controller and central arbiter,
WD6036LP micro channel bus controller and memory controller, and
WD5020 address/data buffers.

Other components include:
System ROM 30b is 128K × 8 bits and contains software for the power on test and the BIOS, and some system data. Two 27C512 memory chips are used. This ROM is connected to the local channel bus which has an 8 bit wide data bus. After the system is started, the BIOS can be copied into system memory for faster access and to permit the system ROM to be placed in standby mode to conserve power.
A real time clock 82 is implemented using an MC146818A. This component also contains 64 bytes of RAM that is maintained by an integral battery.
Nonvolatile CMOS RAM 84 provides 8 Kbytes of battery-backed memory for storage of system configuration data.

1.3.1 Optimizer

The "optimizer" 88 is a VLSI chip that combines a variety of functions, including:
clock generation, including program-controlled speed switching (in the notebook computer, changes in system clock speed are used to improve power efficiency);
control signals and I/O register address decoding for the SCSI port and hard disk drive are generated from micro channel signals;
various I/O registers, including programmable option select registers (the devices supported by the optimizer all appear to the main processor as a single micro channel device; the characteristics of such devices are described elsewhere, such as in the "IBM Personal System/2 Hardware Interface Technical Reference") and registers for system power control and for controlling main processor clock speed;
interface between the optional keyboard and the interface processor;
interface between the main processor and the interface processor.

The last two listed functions are the most relevant to the present invention.

Figure 4A:
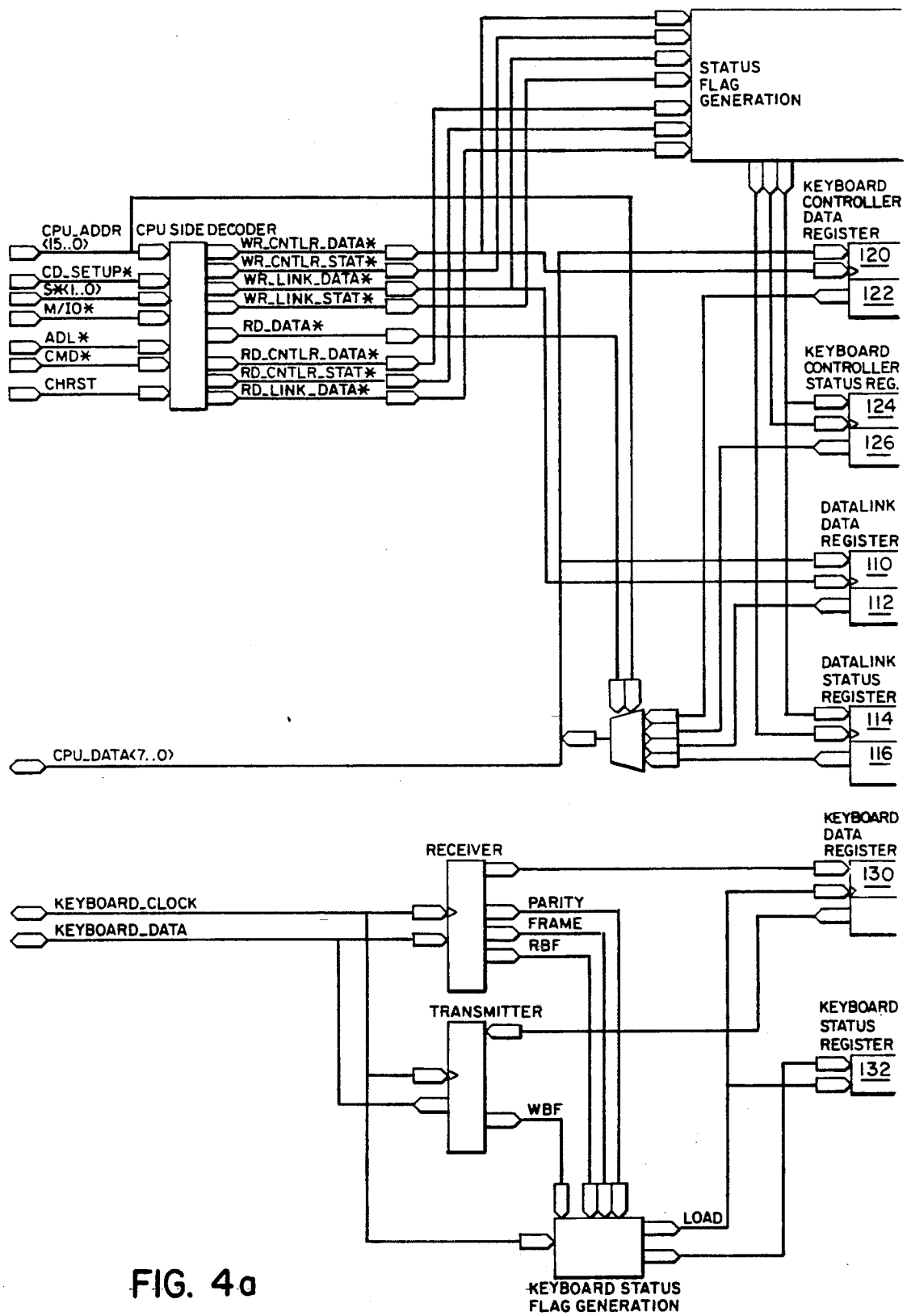
FIG. 4 is a block diagram of circuitry used in communications between the main processor and the interface processor.
Figure 4B:
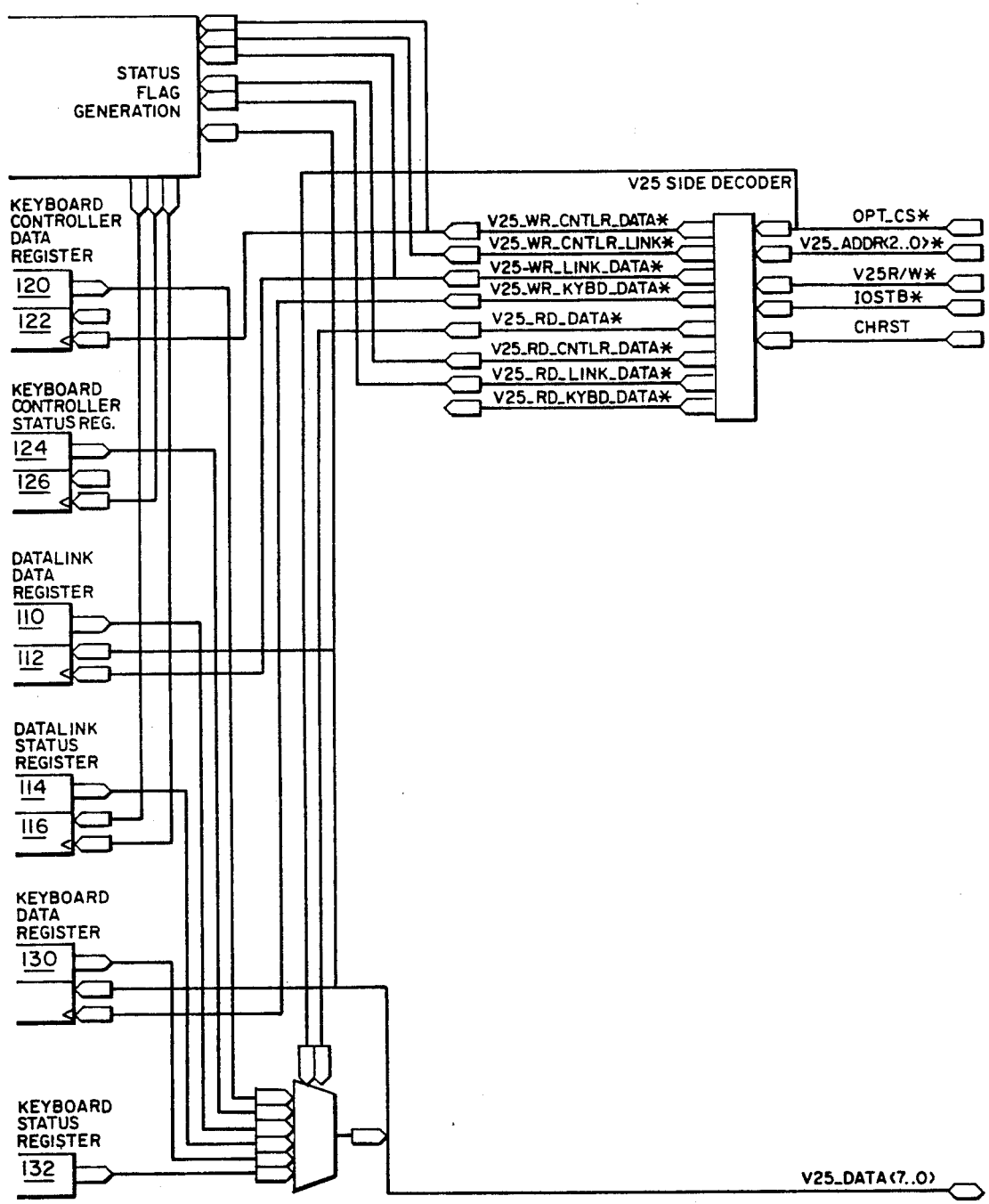

Circuitry in the optimizer implementing the interprocessor interface 50 and the keyboard interface 54 is illustrated in greater detail in FIG. 4.

For the communication link between the main processor and the interface processor that is known as the "datalink", the optimizer provides four registers: a data register and a status register for each direction of communication (110, 112, 114, and 116 in FIG. 4).

To provide what the main processor sees as a standard keyboard port (a de facto standard, represented by computers such as IBM's PS/2 series), the optimizer also implements four registers: a data register and a status register for each direction of communication (120, 122, 124, and 126 in FIG. 4).

The optimizer also implements an interrupt ID register and and interrupt mask register for the interface processor.

Although the interface processor handles the communication of keystrokes to the main processor, the optimizer provides the bidirectional serial interface to the (optional) physical keyboard; this frees the interface processor from monitoring the keyboard clock and data lines, and permits the interface processor to deal with whole bytes. To provide support for connection of a physical keyboard, the optimizer provides a data register 130 (bidirectional) and status register 132 that is accessed by the interface processor.

The interface processor sends keystrokes (both from the optional physical keyboard and from the simulated keyboard) by interacting with the main processor as if the interface processor was an 8042 keyboard controller. As a standard keyboard controller also provides for data from an auxiliary device (typically a mouse), as well as from a keyboard, this capability is provided as well.

The optimizer also provides a "datalink" connection between the interface processor and the main processor that is used for various communications between the processors, including software loading at boot time and as needed at any other time.

1.3.2 BGA

The BGA 86 (FIG. 5) provides most of the circuitry to enable the simulated devices user interface to be displayed without corrupting the current application's display data. In particular, the BGA is a VLSI chip that implements most of the ink/mask circuitry and provides data and control signals for the display. FIG. 6 illustrates greater detail of the multiplexer 46 (of FIG. 2), which is included the block labeled "Video Data Replacement" in FIG. 5.

The BGA receives data from the VGA controller, provides the interface processor with read/write access to the ink/mask memory, and sends data to the display. The BGA monitors VGA signals (horizontal sync, vertical sync, and pixel clock, which is once per 8-pixel byte—4 pixels from the top half of the display and 4 pixels from the bottom half of the display) so as to be able to coordinate the data from the ink/mask data with the data generated by the VGA controller. The BGA also uses a dot clock signal (8 times pixel clock) from the VGA controller to sequence its operation.

The VGA controller is designed for use with DRAM devices having a multiplexed memory address bus. However, the VGA display buffer is implemented with PSRAMs that do not use a multiplexed address bus; hence, address latches are used. Further, the BGA includes circuitry to derive the control signals for the PSRAMs from the signals generated by the VGA controller.

Figure 8:
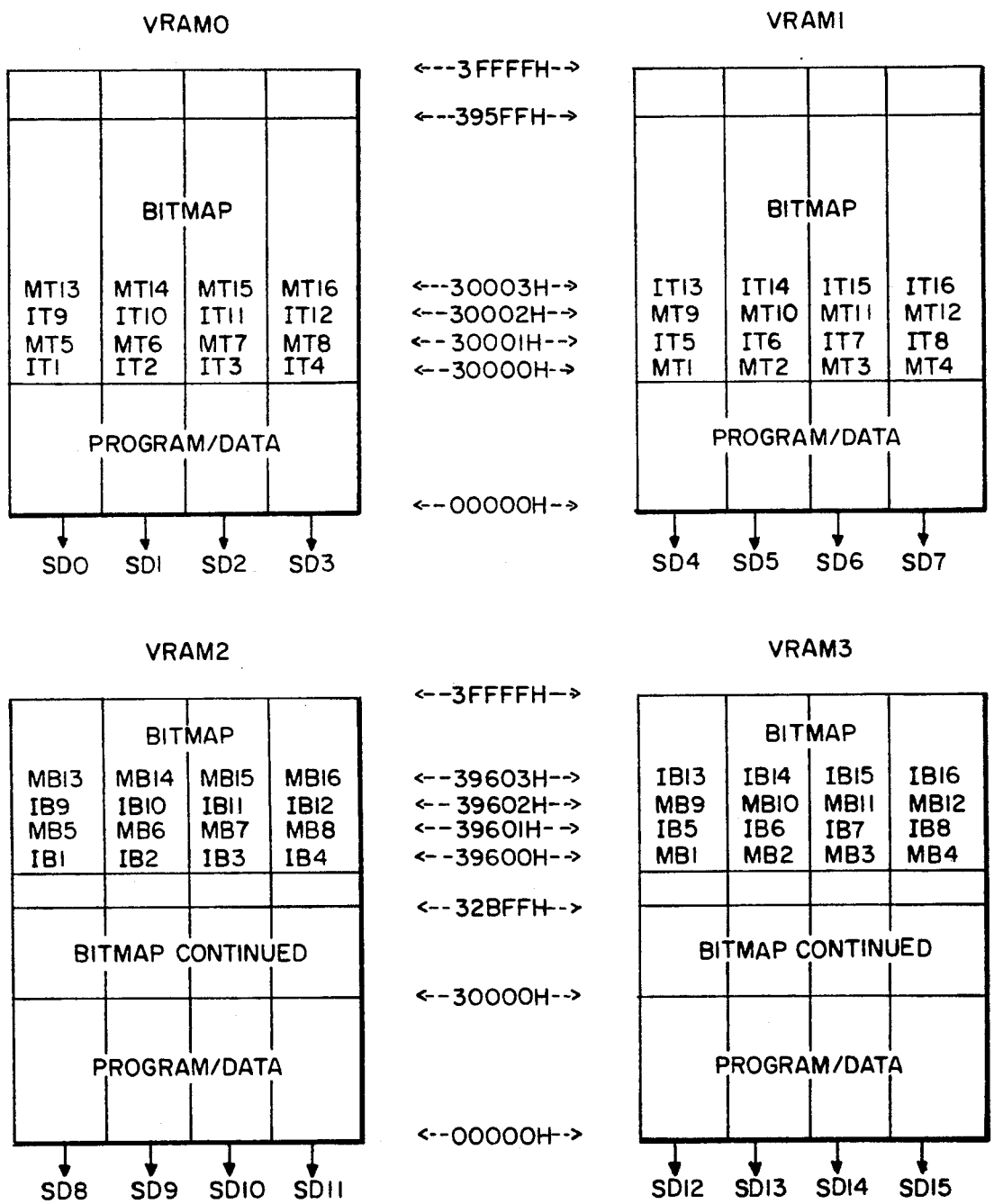
Figure 9:
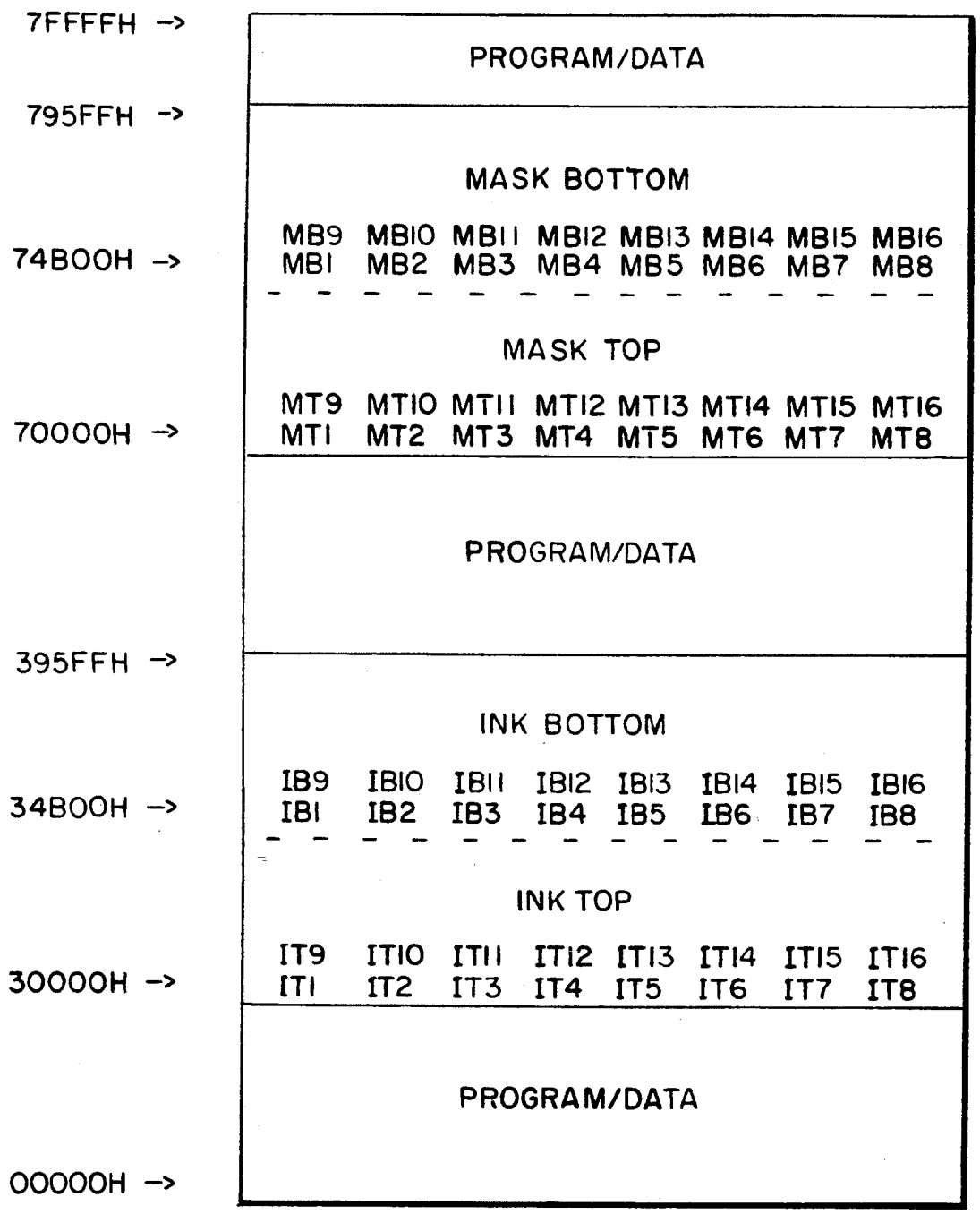

There is a 512 Kbyte memory array attached to the BGA that is the main memory for the interface processor. Of this, 76,800 bytes are used for the ink/mask plane display buffer. This display buffer appears to the interface processor as two 38,400 byte blocks (as shown in FIG. 9): the ink plane starts at 30000$_H$; the mask plane starts at 70000$_H$. These locations, in combination with the allocation of addresses to individual memory devices, results in the ink plane and mask plane data for each pixel being stored in a separate memory device (as shown in FIG. 8); thus it is possible to retrieve both simultaneously when refreshing the display. The remainder of this memory (about 400 Kbytes) are available to be used by the interface processor for program and data storage.

This array is implemented with four 256 K by 4 bit video RAM (VRAM) devices (524256 chips). These are dual-ported devices: each chip has a 4-bit read/write port connected via circuitry in the BGA to the interface processor; each chip also has a serial access read-only port that is used to provide data for the display. Each chip has four 512-bit shift registers, which are used to drive the serial access port. Once the shift registers have been loaded, access via the other port may take place while the serial data is being shifted out the serial port.

1.3.2.1 Memory Mapping

It is desirable for the interface processor to be able to read a byte of ink data (ink data for 8 pixels) in one memory cycle and to read a byte of mask data (mask data for 8 pixels) in one memory cycle. It is also desirable for ink and mask data both be available for 8 pixels at once for display refresh.

FIG. 7 identifies the first 16 pixels of the top half of the display as T1 through T16 and identifies the first 16 pixels of the bottom half of the display as B1 through B16. Data is provided to the LCD display 8 bits at a time; these 8 bits correspond to 4 pixels in the top half of the display and 4 pixels in the bottom half of the display. FIG. 8 illustrates how the ink and mask data is stored in the 4 VRAM chips, for example: IT1 is the ink bit for pixel T1; MT1 is the mask bit for pixel T1; IB1 is the ink bit for pixel B1; MB1 is the mask bit for pixel B1. In VRAM0 and VRAM1 ink and mask data is stored from addresses 30000$_H$ through 395FF$_H$. In VRAM2 and VRAM3 ink and mask data is stored starting at 39600$_H$. After address 3FFFF$_H$, the addressing wraps, such that the ink and mask data continues at locations 30000$_H$ through 32BFF$_H$.

For display refresh, data is read out of the VRAMs as 16 signals SD0 through SD 15, as indicated in FIG. 8. FIG. 6 shows how these signals are processed through two multiplexers 150 and 152 (each of which selects one of two sets of eight signals) and combined with the data from the VGA controller in a set of eight one-bit multiplexers 160.

For display refresh, data is read out of the VRAMs in the sequence shown in FIG. 8. For example, serial data bit 0 (SD0) will carry an ink bit, then a mask bit, then an ink bit, etc.; at the time SD0 carries an ink bit, SD4 carries a mask bit. The, the multiplexers 150 and 152 are used to swap 4-bit nibbles from each VRAM on alternate 16-bit words.

When the interface processor accesses the memory, the BGA controls the addressing to the VRAMs such that a byte of ink data is composed of an odd-numbered location from one VRAM and an even-numbered location from another VRAM. Further, although the ink data is accessed at sequential interface processor address locations (starting at 30000$_H$), it is stored in every other memory location in each of the VRAM chips (in the VRAM chips it alternates with mask data, which appears to the interface processor beginning at 70000$_H$ at a higher range of addresses). Thus, the ink data appears in the interface processor's address space as one continuous block of data (30000$_H$ through 395FF$_H$), and the mask data appears in the interface processor's address space as another continuous block of data (70000$_H$ through 795FF$_H$). This is illustrated in FIG. 9, with bit identifications corresponding to those of FIG. 8 and corresponding to the pixels of FIG. 7.

1.3.2.2 Display Timing

The VGA controller 38 generates display data that is one bit per pixel. This data is provided 8 pixels at a time: for 4 pixels in the top half of the display and for 4 pixels in the bottom half of the display. The VGA controller also generates 3 control signals to accompany this display data: a pixel clock, once for each 8 pixels (byte) of data; a horizontal synchronization signal; and a vertical synchronization signal. The VGA controller also provides a "dot clock" that is 8 times the rate of the pixel clock.

1.3.2.3 Multiplexing of VGA and Ink Data

Figure 5:
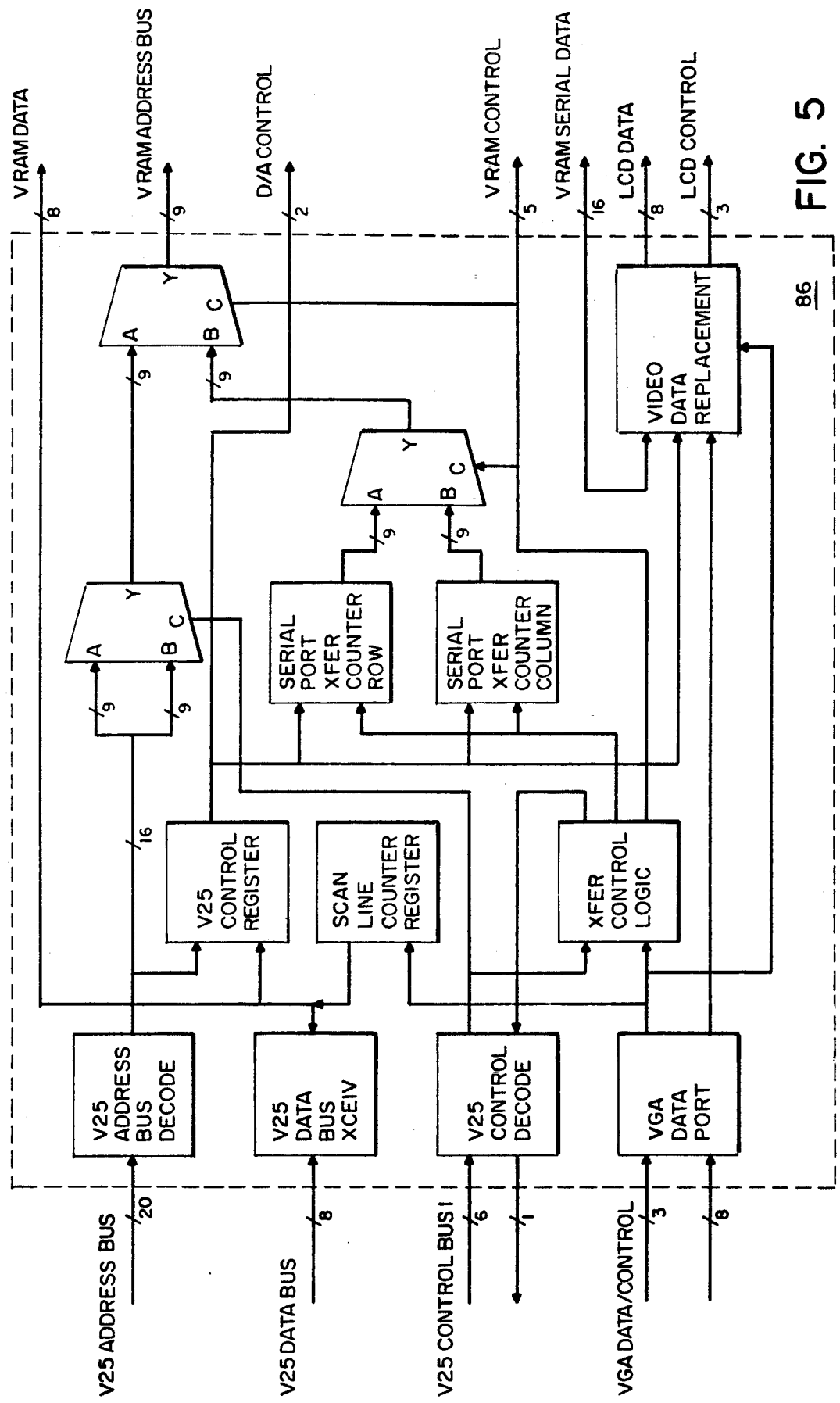
FIG. 5 is a block diagram of circuitry in the display subsystem.
Figure 6:
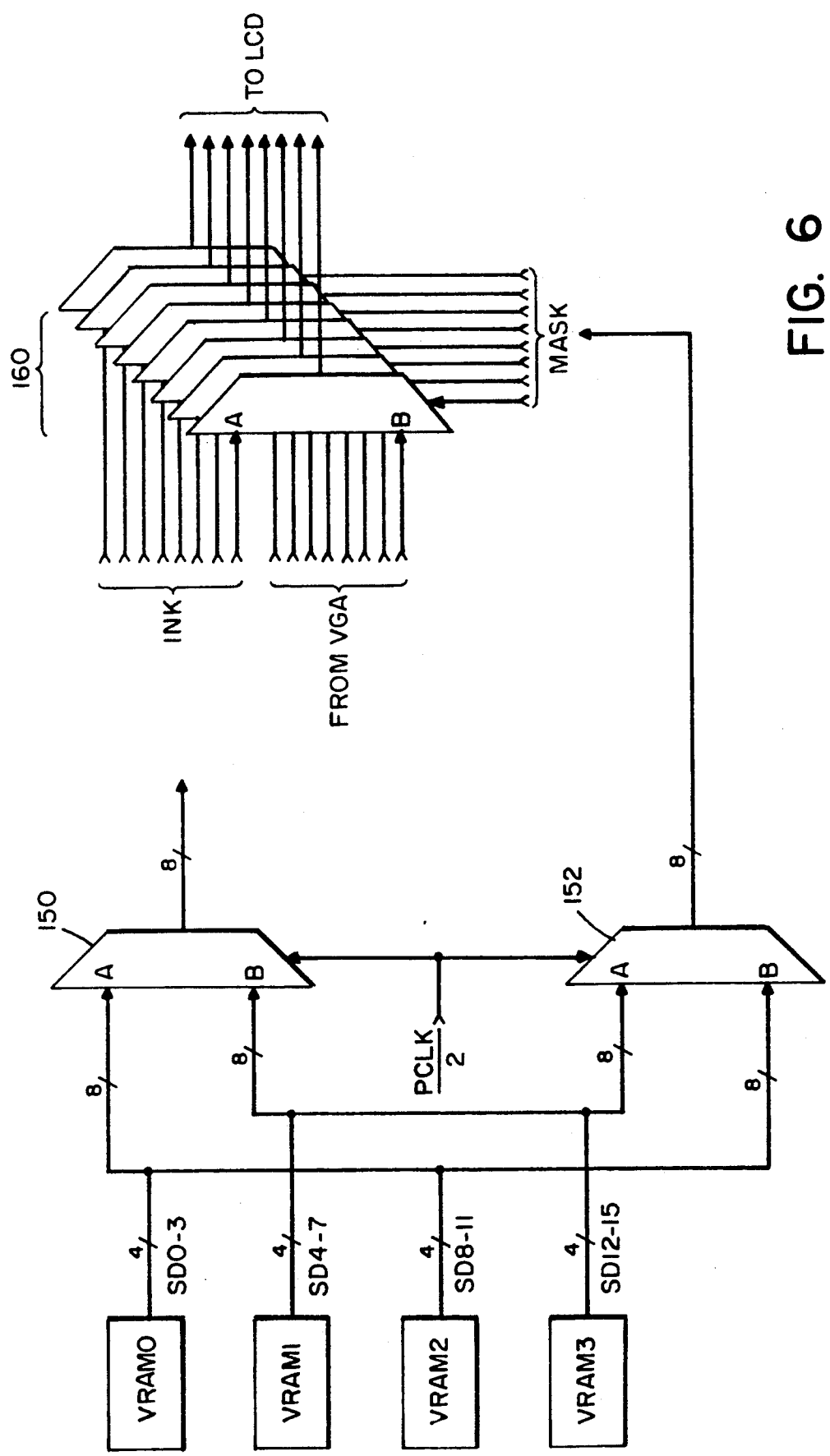
FIG. 6 illustrates the display data multiplexing circuitry of the display subsystem.

The block in FIG. 5 labeled Video Data Replacement (shown in greater detail in FIG. 6) includes 8 single-bit multiplexers 160. Each multiplexer uses a mask bit to select either a VGA data bit or an ink bit. At each pixel clock time, 4 sequential pixels for the top half of the display and 4 sequential pixels for the bottom half of the display are simultaneously processed through the set of multiplexers. The control signals from the VGA controller (pixel clock, horizontal sync, and vertical sync) are delayed so as to be synchronized with the video data coming out of the BGA.

1.3.2.4 Display Modes

Normally, the BGA provides display data that is a combination of the data from the VGA, ink, and mask planes: for each pixel, the BGA provides VGA data or ink data depending on the value of the mask plane data.

The BGA provides for blanking of data from either or both of the data sources (VGA and ink/mask). This permits elimination from the display of application data or interface data without the need to clear the corresponding display buffer.

The BGA can also be placed in a "sleep" mode, to reduce power consumption. In this mode, the interface processor has access to all VRAM memory locations. The VGA data will be passed to the display without monitoring the VGA timing signals. BGA sleep can be activated by setting a bit in the BGA control register and can be activated by the VGA sleep signal (received on an external pin from the optimizer). When activated by the VGA sleep signal, the display output drivers are disabled, so that power can be removed from the display without damaging the display device.

1.3.2.5 The Interface Processor the BGA

The BGA provides the interface processor with access to the VRAM as if it was 120 nsec DRAM operating with 2 wait states.

The BGA controls the interface processor's Ready line during the time that the video shift register is being loaded, so that the display can be refreshed using the VRAM in a way that is transparent to the interface processor.

The BGA control register includes the following bits: BGA sleep, blank VGA, blank ink. There is also a read-only register that indicates the number of the current scan line.

1.3.2.6 BGA Optimizer

The BGA is connected to all of the interface processor's address lines, while the optimizer is connected to a subset of these lines. Thus, the BGA is arranged to generate a chip select signal for the optimizer. This chip select is active for any I/O address in the range $10_H$–$17_H$, addresses corresponding to the optimizer's eight I/O mapped registers.

1.3.2.7 Contrast Control

Display contrast is controlled by the output of an 8-bit D/A converter. The data register of this converter is mapped to a memory location. Writing to this memory location has the dual effect of writing to VRAM as well as latching a new value into an external D/A converter. Thus, the current value of the converter can be determined by reading that VRAM location.

1.4 Communication between Main and Interface Processors

The main processor and the interface processor communicate with each other via two separate mechanisms. The interface processor communicates keystroke and mouse data via the I/O ports and protocol normally associated with a keyboard controller. A separate, more general purpose communication mechanism (referred to as the "datalink") is also provided.

1.4.1 Datalink Registers

The datalink between the main processor and the interface processor uses, for each processor, a receive data register (8 bits), a transmit data register (8 bits), a status register (of which two bits are used), and a control bit (located in a register with control bits used for other purposes); one processor's transmit register is the other processor's receive register.

The interface processor accesses this information via I/O ports with fixed addresses.

The datalink registers are among those supported by the optimizer. Optimizer POS register 103 provides four bits that are used to control the address mapping of the datalink and status registers as well some of the other registers supported by the optimizer.

One status bit indicates whether or not there is data in that processor's receive register. The other status bit indicates whether that processor's transmit register is empty.

The control bit permits the corresponding processor to determine whether an interrupt will generated when the other processor sends data.

1.4.2 Datalink Protocol

Low level communications protocols are defined by which the main processor can obtain diagnostic information from the interface processor, download data (including software) into the interface processor's main memory, control power conserving features, and provide a basic mechanism by which applications running in the main processor can communicate with the interface processor.

For general purpose communication from the main processor to the interface processor, a BIOS call in the main processor can send a block of data to the interface processor.

For general purpose communication from the interface processor to the main processor, application-provided datalink data handlers are used. BIOS calls are provided to install a datalink data handler, save the current datalink driver state (another BIOS call is provided that indicates the amount of memory needed to save the current datalink driver state), and restore a previously saved datalink driver state. By the use of datalink data handlers, a plurality of applications can share access to the datalink. The BIOS maintains a count of the number of saves minus restores, and each datalink driver state save includes the relevant count (i.e., nesting level). When a datalink driver state is restored, this count is checked, and an error returned, if the nesting level does not match.

To receive data from the interface processor, an application must provide a routine that is to be called when data is received from the interface processor. The application registers this data handler routine with the datalink driver by the "install" BIOS call mentioned above.

Because a pointer to the current datalink data handler is stored in the driver state save area, the data handlers can easily be chained. If a handler determines that the data is not for it, the handler can defer to the handler pointed to in the state save area created when the handler was installed.

These BIOS calls return a datalink status byte with bits indicating the following error conditions: transmission in progress, reception in progress, illegal datalink driver state restoration, time out, busy, and invalid function request.

Further, BIOS calls are provided to perform certain specific interface processor-related actions, such as reset the interface processor, echo data (to test the datalink), get diagnostic results (returns the results of the interface processor's firmware diagnostics), download initial code and data (and jump to a specified location), enable and disable F1 key generation, get battery voltage level, get interface processor firmware revision level.

When the system is booting, there are certain situations (such as configuration errors that should be brought to the user's attention) where the user is asked to press the F1 key or to tap the tablet (indicating that the user has seen the error message). After the main processor sends a command to the interface processor to enable F1 key generation, the interface processor will send an F1 keystroke the first time the user taps the tablet. There is a command by which the main processor can then disable F1 key generation (for example, so as not to generate a second F1 keystroke when the user taps the tablet after pressing the F1 key on the optional keyboard).

The main processor also supports certain commands initiated from the interface processor, such as turning the display backlighting off and on, setting the hard disk timeout, setting the maximum system clock speed, setting the minimum system clock speed, initiating system shutdown, initiating system wake-up.

Drivers for communication with the interface processor across the datalink can be implemented by either of two methods. As described above, a datalink data handler can be registered with the BIOS. Alternatively, a driver can take over the datalink interrupt; presumably this driver would then chain to the normal BIOS datalink driver when appropriate.

1.4.3 Tablet Data over the Datalink

The main processor can request that tablet data be sent to it; after such a request, the interface processor will send to the main processor 5-byte blocks of tablet data whenever they become available and are not used by the simulated devices interface. In addition, the main processor can control the tablet by sending commands to the interface processor directing it to send commands to the tablet. The main processor can send a command to the interface processor that specifies the calibration parameters that the interface processor is to use. The main processor can send a command indicating that the interface processor should discard any tablet data that is waiting to be sent to the main processor.

The BIOS for the main processor provides a mechanism by which an application running in the main processor can register to receive tablet data. More than one application can be registered at once, in which case, a chain can be formed such that tablet data not used by one application can be made available to other applications further down the chain.

2 Simulated Devices

A set of simulated devices is available to the user: keyboard, mouse, handwriting input device.

Some "simulated devices" in fact simulate, both to application programs and to the user, devices with which many existing application programs have been designed to operate. Others look to the user unlike any of the devices with which the application is designed to operate. For example, the handwriting input device is less closely related to a standard device. In a sense, the handwriting input device simulates (to the user) handwriting input previously only available with applications developed specifically for use with handwritten input. From the application's perspective, this device simulates a keyboard; although keys need not be involved (real or simulated), the handwriting input device provides keycode data to the application.

These input facilities are "devices" in the sense that they appear to the user to exist independent of any particular application program and largely independent of each other. Visually, the device display does not permanently interfere with the application display. This can be accomplished by providing each with separate display area, such as separate windows on a large display. However, the preferred embodiment uses one screen area for both application display and for display of the interface devices. The to the user, the devices appear to be on top of the application's display.

Further, in implementation, these devices are independent of the various application programs with which they may be used. In the preferred embodiment, they are even implemented in part using a processor separate from the processor on which the application is running.

In order to provide maximum independence between the device simulation and the application (and to improve shared display performance), hardware support, as described above, is provided for the simulated device display. A display plane of the type for which many pre-existing applications have been designed is provided. Two additional planes are also provided: an ink plane and a mask plane. The displayed value for a pixel is determined from the values for that pixel from each of the three planes as follows: when the mask plane pixel has one value, the application plane pixel value is displayed; when the mask plane pixel has another value, the ink plane pixel value is displayed.

The ink plane is so named because one of its functions is to display "electronic ink" so that, at times, the stylus, tablet, and display operate as if the user was writing with a pen on a paper: when the stylus is in contact with the tablet, a trail of "ink" is displayed as the stylus is moved across the tablet. For much of the operation ink is not used; for example, there is no need to clutter the display with ink as the stylus drags an icon. On the other hand, electronic ink need not be limited to the ink plane. Whereas the simulated devices only use the ink plane, a particular application might put ink in the display plane that is provided for use by these applications; for example, a "paint" application may display electronic ink in response to movements of a locator device.

A row of function buttons is also provided. Those illustrated in FIG. 1 are DEVICES, CONTRAST, FREESTYLE, INFO (16a, 16b, 16c, and 16d, respectively). These are located on a portion of the tablet that extends beyond the normal screen display. There are permanent labels printed to indicate the portions of the tablet that function as each of these buttons. Alternatively, the display could provide the labels for the function buttons and/or the function buttons could be implemented by a mechanism separate from the tablet; in any case, there should be some way (separate from the display) of identifying the contrast button when the contrast is so badly adjusted that the display looks blank.

The function buttons are used (among other things) in the control of the simulated devices.

There is a DEVICES button 16a that is used to activate and deactivate a "device tray". When the user initially presses the DEVICES button (by touching that portion of the tablet corresponding to the device button), a tray of the available simulated devices is displayed. The user can then drag from the tray those devices that the user wishes to be active, and can drag onto the tray those devices previously activated, but which the user does not presently need. The user then presses the DEVICES button again, which results in removal (from the display) of the tray and any devices on it. For convenience, the devices appear on the tray as small icons (referred to as stamps); also, when the tray is displayed, devices present on the screen because they were previously removed from the tray are also displayed in stamp form; when the tray is removed, the visual representation of any of the remaining devices (i.e., not located on the tray) are replaced by the larger, typically more complex, icons which are the visual forms of the simulated devices that the user "operates".

There is an INFO button 16d that is used to activate and deactivate an information device. The user first touches the INFO button, causing an INFO icon to appear. Initially the INFO icon displays information about how it is to be used. The user then touches a function button or icon about which the user would like information; this causes information relating to the touched object to appear in the text area of the INFO icon.

The CONTRAST function button 16b controls one aspect of the appearance of the display: its contrast. This button has two portions: one for increasing contrast; one for decreasing contrast; these buttons auto-repeat at ½ second intervals, with the initial contrast increments being small and later increments being larger (when the stylus is held down for a relatively long time).

Function buttons can be provided to activate particular applications. For example, a "FREESTYLE" (trademark of Wang Laboratories, Inc.) button 16c is provided, which activates an annotation and desktop management application. In particular, this button results in data being sent from the interface processor to a resident Freestyle driver in the main processor, which loads additional Freestyle components. The interface processor makes available to the main processor tablet data that is not used by the user interface provided by the interface processor; the Freestyle application reads this tablet data.

These function buttons could be organized in different ways. For example, Freestyle and Info could be available from the Devices tray; there could be separate function buttons for some or all of the devices, in the extreme case eliminating the need for a Devices tray. Buttons could be provided to perform additional functions, such as a LIGHT button to control the amount of backlighting for the display.

2.1 Characteristics Common to the User Interface Icons

The icons are rectangular (or a combination of rectangles). Alternatively, the icons could be other shapes; however, drawing icons and determination of whether the stylus is in an icon is most efficiently done for rectangles.

Most of the icons include "sub-icons". These sub-icons typically correspond to particular functions and often function as button areas that the user taps with the stylus.

Figure 10:
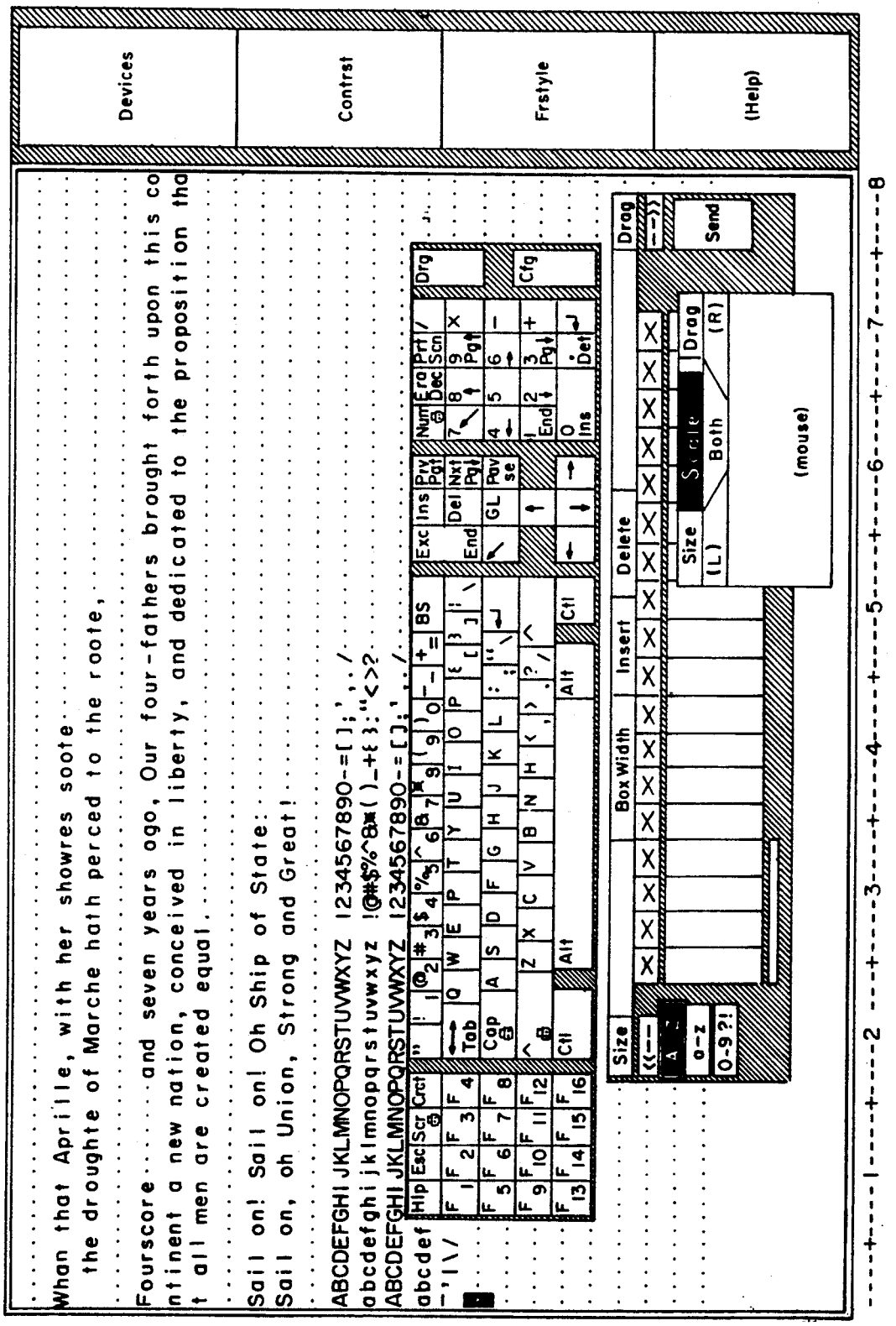
FIG. 10 is a screen display showing three simulated device icons: keyboard, handwriting, and mouse.

FIG. 10 is a screen display showing the icons for three simulated devices. Behind these icons is the display of a text editing application adapted to receive input in the form of keystrokes and mouse data, and not adapted to receive tablet data.

The keyboard device is shown with four groups of keys (a group of function keys, a main QWERTY keyboard, a cursor control keypad, a numeric keypad) as well as drag and configure buttons.

The handwriting device is shown with buttons on the top for sizing, adjusting box width, inserting, deleting, and dragging. Buttons are also shown for scrolling the displayed character boxes left and right, for sending a line of characters, and for turning on and off three sets of characters (so as to appropriately direct the character recognition algorithm). The main body of the icon displays a series of boxes in which the user can write characters. For the example shown in this figure, the recognition result is shown above the box in which characters are written.

The mouse device is shown with buttons for sizing, setting the scale factor, and dragging, as well as three "mouse button" control buttons (one corresponding the left button of a mouse, one corresponding to the right button of a mouse, and one for effectively pressing both left and right buttons simultaneously). Below the button areas is shown a mouse movement area that corresponds to the mouse pad that one might use with a physical mouse.

In FIG. 10 the DEVICES, CONTRAST, FREESTYLE, and INFO buttons are shown along the right side of the display; this is an alternative to the example shown in FIG. 1 where these are shown along the top.

2.1.1 Feedback to the User of Stylus Position

When the stylus is in sensing proximity to the tablet (meaning that the tablet can sense the stylus adequately to provide X-Y position data), stylus position can be indicated to the user. This is particularly helpful when the tablet is not located on top of the display. In any case, it makes easier the user's task of hitting small targets, and helps the user overcome small discrepancies between where the stylus appears to the user on the display and where on the display the system locates the stylus. In general, when the stylus is in proximity, a cursor shows its location. In some situations, the appearance of this cursor is location dependent, therefore providing further feedback; in other situations, feedback of position takes the form of highlighting particular areas of the display in response to stylus position (e.g., keys on the simulated keyboard).

2.1.2 Holding Stylus Down

In many circumstances, the time for which the stylus is held down is of no particular significance. In other circumstances, holding the stylus down can result in automatically repeating a function; for example, holding the stylus on a simulated keyboard key will result in auto repeat action similar to holding down a key on a physical keyboard. In yet other circumstances, holding the stylus down will cause a function button to "lock": for example, a simulated mouse button will simulate a press and release when the stylus is down for a short time; whereas a simulated mouse button will stay "pressed" even after the stylus is removed if the stylus is held down long enough.

2.1.3 User Interface Rules Dealing With User Targeting Errors

Various rules are used to govern operation of the user interface to facilitate the user's understanding of how stylus actions will be interpreted.

2.1.3.1 "Touch point" rule

In most situations, a "touch point" rule is more useful than the combination of the leave icon and drag into icon rules, described below.

The touch point rule is that the function to be performed is determined by the first point where the stylus touches. Similar to the "drag into icon" rule, a function will not be activated by crossing a boundary into an icon. However, this rule allows a function to continue to be performed even if the stylus leaves an icon.

The touch point rule is particularly useful for the simulated mouse device. This rule enables the user to maintain a small mouse icon on the screen, while allowing wide excursions of stylus motion to be used to generate mouse data, as long as the stroke starts in the mouse movement area.

2.1.3.2 "Drag Into Icon" Rule

According to the "drag into icon" rule, an icon's function is not initiated by dragging the stylus into the icon. If a function is being performed according to the touch point rule, that function continues, even if the stylus enters another icon. It is necessary to touch down inside an icon (or sub-icon) to activate the icon's function.

2.1.3.3 "Leave Icon" Rule

For dragging and resizing, an alternative to the touch point rule is used. When the stylus is in a drag or resize sub-icon and leaves the sub-icon:
the icon function stops,
the user interface ignores all tablet data until the stylus is lifted from the tablet.

It makes no difference whether the stylus has moved into the icon from another icon or from an empty area.

This rule is maintained during drag and resize, because during those operations the icon generally moves so that the stylus does not leave the icon. However, if the maximum size is reached, or if the user attempts to drag the icon past a boundary, the stylus may leave the size or drag sub-icon, ending the operation.

Alternatively, this rule could be applied as the basic rule, instead of the touch point rule.

2.1.4 Dragging

All devices have a "drag" sub-icon. This permits the user to move the device on the display, for example, so as to avoid obscuring a particularly important portion of the application display. This "sub-icon" need not be visually indicated in any particular way; rather, it may simply encompass all of the icon area that is not taken by other sub-icons.

The drag sub-icon is located in the upper-right corner of the device icon.

When the stylus touches a drag sub-icon, the device icon is replaced by an XOR "outline"; this indicates to the user that the drag function has been activated.

Until the stylus is lifted (or the stylus moves out of the drag sub-icon, as explained below), this outline is moved on the screen so as to track the motion of the stylus; in other words, the user can "drag" the icon.

No part of the icon will move past an edge of the ink plane display. Thus, when the icon is pushed against an edge, the icon will no longer track the stylus and the stylus can move out of the drag sub-icon; if it does so, the drag operation will end and no other action will be taken until the stylus is lifted.

2.1.5 Sizing

All sizable devices, have a "size" sub-icon.

The size sub-icon is located in the upper-left corner of the device icon. Other possible size sub-icon locations include the entire perimeter of the icon or all corners of the icon.

When the stylus touches a size sub-icon, the device icon is replaced by a black and white outline (to reduce processing load, an XORed outline can be used). This indicates to the user that the size function has been activated.

Until the stylus is lifted (or the stylus moves out of the size sub-icon, as explained below), this outline is changed in size so as to track the motion of of the stylus. The location of the lower-right corner of the icon remains fixed. In other words, the user drags the upper-left corner of the icon.

No part of the icon will move past an edge of the ink plane display. An icon may have a size limitations (there may be limitations on horizontal and/or vertical dimensions, and/or a limitation on the area of an icon). These factors can result in size changes ceasing to follow the stylus, and consequently the stylus can move out of the size sub-icon.

Typically, function boxes (sub-icons) scale with the overall size of an icon. In the handwriting icon, the letter boxes do not change size; the number of boxes visible changes.

The user can select the parts of the keyboard that are to be active (see discussion of the keyboard device configuration button, discussed below), rather than sizing the keyboard device icon.

Other arrangements for sizing can be used, such as sizing sub-icons in each corner or sizing by dragging a border line (e.g., as used in the Windows product of Microsoft Corporation).

2.1.6 Stacking

The icons on the display are ordered according to how recently each was accessed (touched or activated via a function button, as with the INFO icon). Icons may cover overlapping areas on the display. When icons overlap, the most recently accessed of these icons is displayed in the overlapping area.

Thus, when icons are clustered together, the user will see them as an overlapping stack of icons, with most recently used icons higher in the stack. Touching any part of an icon will make it the topmost icon. An icon that is completely covered by other icons cannot be touched until icons above it are moved enough to expose a portion of the covered icon.

2.1.7 Sending a Character

Sending a character to the application is accomplished (preferably, via hardware) such that, to the application, it is as if the character came from the keyboard. Thus, the sending of a character involves performing the low level I/O operations that a keyboard would perform. One of the consequences of this is that keycode data (information about the pressing and releasing of keys) is sent, rather than ASCII character codes.

The user interface subsystem firmware keeps track of the status of shift and shiftlock (including changes due to key actions from the optional physical keyboard), so that, for example, when in the shifted state, the user writes a lower case character, a simulated device can send a sequence to the firmware containing unshift/character/shift information. The firmware then translates these codes as needed and sends them over the keyboard port to the main processor.

The low level communication of the interface processor with the main processor that sends simulated keystroke data to the main processor is the same as that used to send actual keystroke data when a physical keyboard is attached.

The low level software that controls communication with the main processor is part of the interface processor's firmware. It receives data from the simulated devices user interface and sends it as keystroke data, mouse data, or tablet data, depending upon how the data is identified.

This low level software can assure that a multi-code sequence being sent on behalf of one device (e.g., simulated keyboard) is not inappropriately interrupted by the sending of data on behalf of some other device (e.g., physical keyboard).

This low level software keeps track of the shift state. It is up to the simulated devices user interface to make appropriate use of the shift state information (as described above).

2.2 Handwriting Recognition Device

The handwriting recognition input device provides a mechanism by which handwritten characters can be presented to an application as if originating from a keyboard. The primary body of the icon for the handwriting recognition input device contains boxes into which the user can write characters. (Other ways of delineating the character locations may be used, such as: tick marks, hash marks, shaded areas. Furthermore, character recognition techniques that do not rely on such explicit character separation may be employed.) After characters are written, the boxes aid in editing the string of characters. It is also possible to use other algorithms for parsing strokes into characters (stroke segmentation), and eliminate the need to display boxes.

The stroke data is processed by a recognition algorithm that recognizes all of the printable characters when legibly written as discrete characters. The data provided to the recognition algorithm includes descriptions of the strokes, their position within the character box, and an indication of the character set (e.g., alphanumeric, alphabetic only). A more complex algorithm for run-on characters could also be used.

A pre-trained algorithm is useful because the user may never need to train the algorithm; yet, the user has the option of training the algorithm to handle some particularly idiosyncratic characters. Algorithms that require training and those that are not trainable are also usable.

After characters have been recognized, the user can edit the string of recognized characters and can send the string to the application.

2.2.1 Writing Characters

Each character is written in a separate box. Characters can be written into the boxes in any order; it is not necessary to write the characters from left to right. When writing in the boxes, electronic ink is displayed, simulating writing with a conventional pen.

2.2.1.1 Stroke Parsing and Character Recognition

A handwritten character is made up of one or more handwriting strokes. In order to be considered a handwriting stroke, the stylus must start within the writing area of the icon. This area extends slightly (e.g., about ⅛ inch) beyond the character boxes. The stroke ends when the user lifts the stylus or when the stylus leaves the character writing area. Electronic ink is displayed for handwriting strokes; this indicates to the user exactly what the system understands the character strokes to be (as well as aiding the user in writing).

The stroke buffer has two parts: one contains data at the table resolution (this higher resolution is more suitable for character recognition); the other contains data at the display (pixel) resolution (for use in controlling the display of electronic ink).

The "average" position of a stroke determines which box it is "in". For a single row of character boxes, the average of the x coordinates of the digitized points in the stroke is used to determine the box with which a stroke is to be associated.

Stroke Parsing—Algorithm A

The following outlines one approach to the stroke-by-stroke processing:

If there is no previous stroke:
 the recognition algorithm is applied to this stroke,
 the result is displayed in the box this stroke is "in", and
 this stroke is saved.

If there is one or more previous strokes and they are in the same box:
 this stroke is added to the group,
 the recognition algorithm is applied to the group of strokes,
 the new result is displayed in the corresponding box, and
 the strokes in the group are saved.

If there is one or more previous strokes and they are in another box:
 the ink in the other box is erased (the recognition result for that box continues to be displayed),
 the previous strokes are discarded,
 the recognition algorithm is applied to this stroke,
 the result is displayed in the box this stroke is "in", and
 this stroke is saved.

If the stylus touches outside the writing area or if there are no new strokes for some period of time (such as about 1 second):
 the remaining ink is erased (recognition results continue to be displayed), and
 the previous strokes are discarded.

Stroke Parsing—Algorithm B

The following describes a slightly different approach to stroke processing.

Get the next stroke (if a stroke is returned, it will be in the handwriting area) and add it to the (possibly empty) stroke buffer.

Determine with which character box the stroke is associated by computing the "average" X position of the stroke (for a single line of boxes). Ignore the stroke if its average position is in the left or right margin of the handwriting area (rather than in one of the boxes).

If the stroke indicates that the user intended to cross out four or more characters, then delete the characters (and their boxes) that were crossed out (those boxes through which the line passed more than half way).

If the stroke is not in the current box:
  make this the current box;
  erase the ink corresponding to the previous strokes;
  display the recognition result for the previous box;
  move the new stroke to the beginning of the stroke buffer (eliminating the other strokes);
  erase any recognition result that may exist in the box;
  redraw the new stroke.

Get a recognition result for the strokes in the stroke buffer.

Wait for next stylus touch. If it takes too long, or if the next stylus touch is outside of the handwriting area:
  display the recognition result in the current box,
  erase the ink for the previous strokes, and
  clear the stroke buffer.

2.2.1.2 Ink Erasure and Display of the Recognition Result

In prior systems, various algorithms for timing the erasure of ink and the display of recognition results have been used. It is desirable to do so with minimum distraction to the writing process and to do so in a way that provides the user with helpful feedback about the recognition process.

The recognition result can be displayed in an area separate from that in which the user is writing; this is shown in FIG. 10, where spaces for recognition results are shown above the spaces in which characters are handwritten. In this case, a recognition result can be displayed while the ink remains displayed.

Alternatively, the recognition result can be displayed in the area in which the user writes characters. However, in this case, if a recognition result is displayed without erasing the corresponding ink, the overlap of the result and the user's handwriting often results in an illegible mess that is distracting to the user.

An approach use in some past systems is to wait until the user has paused for a sufficiently long period and then erase all at once the ink for all of the characters written so far. This sudden erasure is itself distracting and, by erasing many characters at once, does not help the user understand recognition errors that were due to segmentation errors, instead of misrecognition.

A superior method is the following:
1. Maintain a buffer of all of the coordinates used to ink for each written stroke, on a per-stroke basis.
2. As the strokes are grouped into characters by the segmenter (preferably, but not necessarily in real time), the system uses the buffered record of the coordinates for those strokes to erase only the ink for that segmented character; the memory space for the buffered coordinates corresponding to the erased ink can then be reused.
3. The system may then immediately, or after a delay, display the recognized result character(s) for those strokes, free from any leftover ink.

With this method, results can be displayed on a character-by-character basis without the presence of obscuring ink. Since the transformation of segmented strokes to a recognized character occurs in an obvious fashion the user easily knows when segmentation errors are the cause of misrecognition. Since only the coordinates for a small number of pending strokes need to be buffered, the storage space for ink coordinates can be reduced.

One could vary this method to display temporary recognition results at the end of each stroke, instead of completely segmented characters. In addition, the method could be extended to provide for recalling and redisplaying the ink in place of the recognition results, as a part of an editing process.

Replacing the user's handwritten characters by characters of dramatically different appearance can be distracting to the user. For example, handwritten characters will typically appear as collections of relatively thin lines and character design will typically be simple; in contrast, a more readable character would be heavier in weight and might include serifs.

Thus, the present illustrative system includes a "handwriting" font for use by the handwriting device. The characters of this font are made up of thin lines. Further, the lines, rather than being composed of perfectly straight or evenly curved segments, are slightly wavering, as would be typical of a handwritten character.

When a character recognition result is to be displayed in the area in which the user was writing, the character is displayed in the handwriting font.

2.2.2 Editing

2.2.3 Function Buttons

The handwriting recognition input device icon has several sub-icons:
  drag,
  sizing,
  box size,
  scroll left,
  scroll right,
  insert,
  delete, and
  send.

2.2.3.1 Insert

The user can insert a blank box, which can be left blank for a space or into which the user can write a character. A box is inserted by touching the insert function button, which turns dark to show that it is activated; the user then touches a point in the text line to indicate where a blank box should be inserted and drags the stylus across the line of boxes. Blank boxes are inserted starting at the box boundary that is closest to where the user first touched (i.e., touching somewhere between the middle of one box and the middle of the next box will result in the blank box being inserted between those two boxes) and ending at the box boundary that is closest to where the user ended the stroke.

2.2.3.2 Delete

The user can delete boxes by use of the delete function button in a manner analogous to the way boxes are inserted with the insert function button. The user touches the delete function button, which turns dark to show that it is activated; the user then touches a box to be deleted and drags the stylus across the line of boxes. When the user lifts the stylus, the box where the stroke began through the box where the stroke ended are deleted.

2.2.3.3 Erase

The user can erase characters from boxes (leaving blank boxes, rather than deleting the boxes). The user touches the erase function button, which turns dark to show that it is activated; the user then touches a box to be erased and drags the stylus across the line of boxes. When the user lifts the stylus, the characters in the box where the stroke began through the box where the stroke ended are erased; this differs from the "delete" operation in that with "erase" the boxes remain.

2.2.3.4 Scrolling

To avoid obscuring too much of the application display, the user may want to keep the handwriting icon small.

Touching the scroll left function button moves all characters in the text boxes one character to the left. When the stylus is held down, the function automatically repeats. The scroll right function button works in a similar way.

As any ink in the boxes will be erased when the stylus touches outside the boxes (e.g., touches one of the scroll buttons), there will be no ink to scroll, only recognized characters.

2.2.3.5 Sending Characters to the Application

In the preferred embodiment, the handwriting recognition input device operates in buffered mode, in which characters are not sent until the user touches the send function button. Alternatively, an additional mode can be provided (selectable by a function button of the handwriting recognition input device) in which each character is sent after it is completed. Unbuffered mode includes two selectable sub-modes: with and without backspace processing. When backspace processing is in operation, when the user writes a character in one of the boxes corresponding to a character that has already been sent in the current line, a series of backspaces are sent (to back over the later characters in the line), followed by the newly written character, followed by the characters that appear to the right on the line. Backspace processing is useful with applications that permit the user (when using a keyboard) to backspace and retype in order to make corrections in the current line.

In buffered mode, when the user touches the "send" function button, all characters that have been written since the last time the handwriting device was cleared are sent to the application and the handwriting device is cleared (e.g., the indications of recognized characters are removed from the display); if there are no characters to send, a carriage return character is sent.

In unbuffered mode, when the user touches the "send" function button, a carriage return character is sent; if backspace processing is enabled, the line buffer is also cleared.

In unbuffered mode, when writing begins in a box to the right of an empty box, a space character is sent for each empty box. When characters are sent in buffered mode, space characters are sent for any blank box (except that no trailing blanks are sent).

2.2.3.6 Moving and Sizing

The drag and sizing sub-icons operate as described above for icons in general, although the treatment of the writing boxes merits particular attention. When the height of the icon is changed, the height of the writing boxes is changed proportionally. However, when the width of the icon is changed, the width boxes into which characters are written is not changes; rather, the number of boxes displayed changes.

To change the width of the boxes, the user touches the box size sub-icon, drags the stylus by the amount the box size should be changed, and lifts the stylus. When the stylus touches the box size sub-icon, the sub-icon changes color (e.g., is complemented) to show that its function has been activated. Until the stylus is lifted the lower right corner of the lower (if there is more than one line of boxes) right box is moved in the same way the stylus moves; the upper left corner of the upper left box stays fixed. Because the size change is that for the whole line of displayed boxes, a large change in box size may require several strokes in the box size sub-icon.

When increasing the size of the overall icon or when reducing the size of the boxes, the change may be great enough that one or more additional boxes (or one or more additional lines of boxes) are displayed. Preferably, these should be added to the right end of the line (or below, in the case of extra lines), as users are likely to expect added space to appear to the right and/or below their current writing.

2.2.4 Handling Multiple Lines

The handwriting recognition input device can be extended to handle multiple lines. If multiple lines are used, the effective boundary of the current box should be expanded into boxes above or below to enclose the previously drawn strokes. This enables a stroke such as the top of a letter 'T' to be properly included with other strokes even though it may fall completely outside the actual box boundary.

If the handwriting icon is arranged to handle more than one line of boxes, any of the following approaches can be used to determining when to send characters in buffered mode:

1. Like with a single line, send nothing until the user touches the send button. Then send a carriage return after each line.
2. When the user writes in a new line, send the line the user was previously writing on, followed by a carriage return.
3. When the user writes in a new line, send carriage returns and/or cursor movement codes to try to indicate (to the application to which the characters are being sent) the position of the new line relative to the line on which the user was previously writing.

The second and third alternatives are the same for the case where the user writes on successive lines from the top and moving down one line at a time.

2.2.5 Automatic Selection of Pointing and Writing Modes

Many systems have been developed that use a stylus and permit the stylus to be used either as a pointing device (similar in function to a mouse) or for writing (e.g., for handwriting recognition or for annotation). It is conventional to provide a mechanism by which the user explicitly initiates switching between pointing and writing modes; examples include the following: the user picks a menu item with the stylus before writing, the user picks a "writing" field with the stylus before writing in that field (in response to which the system displays an area in which the user is to write), the user double clicks with the stylus before writing, the user presses and holds a barrel switch on the side of the stylus before writing—comparable mechanisms are provided to switch from writing to pointing). The requirement for an explicit action interrupts the user's flow of action before and after writing.

Variations on the technique used by the handwriting recognition device for determining the mode in which the stylus is to operate are also useful outside the context of the handwriting recognition device. For example, this could be used in "forms fill" applications, where the user is expected to handwrite information into certain areas of a displayed form.

This technique assumes that writing is to occur in areas of the display that are apparent to the user as writing areas; displayed images of conventional paper forms with spaces for the user to write are examples.

The technique is as follows:
1. The stylus normally operates in pointing mode.
2. If the user touches the stylus down within the area of a writing field (such as within a rectangular outline), the system ignores the stylus data as pointing input and switches to writing mode.
3. Writing mode is maintained regardless of stylus location until the stylus is lifted.

As an alternative to the second rule, the system can accept as a pointer event the initial touch point, and/or can accept as a pointer event the lift point at the end of writing mode. This would allow the start of writing to also be used to "select" an input field.

As an alternative to the third rule, the system could stay in writing mode until the user lifts (after one or more writing strokes) and touches down at a point outside the writing field, including in another writing field (if in another writing field, the system would immediately switch to writing mode again).

The basic technique provides indications visible to the user of where writing fields are located and provides switching directly between writing and pointing modes based where the stylus touches.

2.3 Keyboard Device

The simulated keyboard device allows users to enter keyboard data by "typing" with the stylus on an iconic keyboard.

Those aspects of the simulated keyboard device relating to detailed key layout can be changed during system setup (e.g., nationality of character set, QWERTY or Dvorak, number of function keys).

Other aspects of the keyboard can be changed at any time by use of the configure function button on the keyboard icon. The keyboard is organized in sections that can be individually selected for use and can be physically arranged relative to each other in a variety of ways. By eliminating sections of the keyboard that may not be needed, one can maximize the visibility of the underlying application display.

2.3.1 Typing

The code for a key is sent when the user touches the stylus to the display of the corresponding key. Touching also causes the display of the key to be shaded, to provide feedback to the user. If the stylus remains in contact with the "key" for more than about ½ second, the key will automatically repeat at a rate of about 5 times per second as long as the stylus remains in the key (simulating a keyboard function sometimes referred to as typematic action). An application can adjust the repeat delay and rate by BIOS calls.

An alternative approach is to let the keyboard device be an exception to the "leave icon" and "drag into icon" rules, and send the keycode, not on touch, but on lift. This would reduce the need for the user to accurately touch a key with the stylus; the user could touch any key and drag around (with highlighting showing in which key the stylus is currently located) and lift the stylus in the desired key. However, with this approach, typematic action based on holding the stylus down would no longer be used.

2.3.1.1 Operation of Shift Keys

On a traditional keyboard, shift-type keys (e.g., control, shift, alt-shift) are used by holding down the shift-type key while another key is pressed. This action is not possible with a single stylus. Thus, for the simulated keyboard device, shift-type keys operate differently from their counterparts on a traditional keyboard. When a shift-type key is touched, it is highlighted, to show that it has been pressed, and keycode data indicating that the key has been pressed is sent; this highlighting continues as long as the shift-type key remains "pressed". (This differs from treatment of a non-shift key, for which both "press" and "release" codes are sent each time the key is touched.) If the next touch is to a non-shift key, the shift-type key stays "pressed" until the stylus is lifted from that key, at which time the highlighting of shift-type key is removed and keycode data is sent indicating that that shift-type key has been released. If the next key touched is a different type of shift key, the first continues to be active. If when a shift-type is active, the stylus touches other than a regular key, the shift-type key is deactivated (removing the highlighting and sending appropriate key release data). Thus, the typical way to send a shifted character is to touch the shift key and then touch the key of the character to be sent; if the user holds the stylus on the key of the character to be sent long enough for it to repeat, the repeated character will also be shifted. If two shift-type keys are active when an regular key is touched, both send release data when the stylus is lifted from the regular key.

There are also lock keys such as caps-lock, num-lock. When such a key is touched, keycodes are sent indicating it was pressed and released. The "locking" action of these keys are not in the simulated keyboard device, but in the interpretation of the keys, as is the case with many traditional computer keyboards. These keys remains highlighted until touched again, thereby indicating their locked status.

2.3.2 Function Buttons

The keyboard icon includes sub-icons for:
drag and
configure.

One might also include a "size" sub-icon. As with the other device icons, the keyboard icon includes a drag sub-icon, by which the user can position the keyboard icon on the display. The keyboard can be reconfigured.

2.3.2.1 Configuring the Keyboard

When the configure button is touched, the configuration editor sub-icon appears. This icon has three parts: storage space, build space, and control space.

There are 65 possible configurations of the 4 keyboard parts. The user effectively selects one of these configurations by moving keyboard parts so as to assemble the parts in an arrangement that approximates one of the possible configurations.

Icons representing the available keyboard parts are displayed in the storage space. The user drags the desired parts into the build space and positions them in approximately the desired relative arrangement. When a part of the keyboard is not wanted, it is dragged back from the build space to the storage space.

When the stylus is lifted, keyboard parts that are in the build area and are arranged so as to approximate one of the possible configurations are automatically repositioned to show the keyboard in that configuration; the remaining keyboard parts are automatically returned to their home locations in the storage area.

When the user again touches the configure button, the configuration editor sub-icon is removed along with any keyboard parts that have not been configured in the build space. The keyboard parts that have been configured now are bound together as one keyboard and can be dragged as one unit.

2.4 Mouse Device

The simulated mouse device allows the user to send mouse data to an application. The present illustrative system simulates the 2-button mouse typically used with the PS/2 computers of International Business Machines Corporation.

The simulated mouse device has several parts:
a drag sub-icon,
a sizing sub-icon,
a movement scaling sub-icon,
a "mouse button" area including 3 sub-icons (left, right, and both), and
a motion area sub-icon.

2.4.1 Mouse Motion

Movement of the stylus while touching the tablet within the motion area of the mouse icon generates mouse movement data. The digitizing tablet provides absolute X and Y coordinate data. However, only movement is used to generate mouse data; touching the stylus to the tablet and lifting (without any movement on the surface of the tablet) will generate no mouse movement data. In particular the mouse movement data is the X and Y distance (measured in "mouse ticks") the stylus has moved since (the more recent of) the stylus touched or the last mouse data was sent. For example, a one inch horizontal movement of the stylus on the tablet will be converted to the same number of mouse ticks no matter where the one inch motion started; furthermore, a quarter inch movement repeated four times (i.e., four repeats of a horizontal movement, lift and return to same starting position) would result in the same cumulative horizontal mouse movement data as a single one inch movement.

An alternative simulated mouse does not include any motion area. Instead, the full tablet area (not used by other functions) acts as the mouse motion area.

A further alternative simulated mouse can be used with applications that permit special mouse drivers. In this case, mouse data is sent that moves the mouse cursor to the location where the stylus is pointing, thus, taking advantage of the absolute location information provided by the tablet.

2.4.2 Function Buttons

2.4.2.1 Movement Scaling

By use of the movement scaling button in the simulated mouse device, the user can adjust the amount of mouse motion that will be generated for a given amount of stylus motion. The movement scaling sub-icon illustrates the current scaling factor by means of a bar, as shown in the mouse device icon of FIG. 10. To change the scaling factor, the user touches anywhere in the scaling bar and drags the stylus to the right or to the left to increase or decrease the scaling factor.

2.4.2.2 Mouse Button Operation

There are buttons on the simulated mouse device that simulate the buttons found on a conventional mouse. However, there are a number of ways in which the operation of the simulated buttons is specially adapted to be activated with a single pointing device, rather than a plurality of fingers.

The mouse button area is divided into three parts. The leftmost and rightmost parts are used to simulate the left and right mouse buttons. The center part is used to effect pressing of both buttons together; this capability is provided because, while a user of a physical mouse is expected to be able to press both buttons together, the user of the simulated mouse device has only a single stylus with which to press the buttons.

Touching one of the button areas causes data to be sent to the application indicating that the corresponding button(s) has been pressed. If the stylus is lifted within about ½ second, data is then sent to the application indicating that the button(s) has been released.

Many applications require the user to hold down a mouse button while simultaneously moving the mouse. To permit a user of the simulated mouse device to perform such simultaneous operations, each of the button areas has the characteristic that if, when activating a button, the stylus is held down for more than ½ second, the button locks "down" (i.e., continues to simulate the pressed position after the stylus is lifted); when the user subsequently touches a locked button area, the lock is released, returning the simulated button to the "up" state (i.e., sending data to the application indicating a button up event).

Whenever a simulated button is "down", the corresponding area on the simulated mouse device icon is highlighted. When the BOTH area it touched, the highlighting of the LEFT & RIGHT button areas are adjusted accordingly, rather than highlighting the BOTH area. When the stylus is held down long enough in the BOTH area, the LEFT and RIGHT buttons are locked; they can be released individually, or by again touching the BOTH area.

2.4.2.3 Moving and Sizing

The drag and sizing sub-icons operate as described above for icons in general.

A change in the size of the simulated mouse device icon does not change the scale factor that is used to convert tablet data to mouse movement data; as described above, this scale factor is separately adjustable by the user. The user can customize the simulated mouse device to the needs of the moment. For example, the user might make the icon very small (so as to obscure little of the underlying application) and make the scale factor large, so as to be able to easily move the cursor anywhere on the screen even with the small movement area. On the other hand, when fine control is important, the scale factor can be made small, so that large stylus movements result in small amounts of mouse motion.

In an alternative embodiment, the simulated mouse device could be arranged so that when its size is changed, the scale factor is automatically adjusted so that a stroke across the motion area results in the same amount of mouse motion no matter what the size of the mouse device icon.

2.5 Info Device

The info device is activated by touching the info button along the side of the display. This results in the appearance on the display of the info device icon. The info button is an "alternate action" button: touching it a second time puts the info icon away again.

The info device includes six sub-icons, five of which are active:
text area for display of the information text,
drag,
size,
previous screen,
next screen, and
home screen.

When the done sub-icon is touched, the info icon is removed from the display and the highlighting is removed from the info button.

The info icon can be moved on the display by use of the drag sub-icon, in the same way as for other icons.

When the info device is activated text explaining how to use the info device is displayed in the text area. Some of the text is highlighted to indicate that it is associated with a pointer to another place in the help text. Selecting with the stylus one of these highlighted portions of text results in jumping to the text identified by the associated pointer. The sequence of jumps through the text is recorded so that the user can "back up".

The next screen and previous screen buttons permit the user to move within the current body of text and to back up through text previously displayed. The home screen button permits the user to go directly back to the first screen.

Disk files for text are accessed by the interface processor by means of the datalink to the main processor.

2.6 Additional Simulated Devices

From the above-described examples, one skilled in the art will appreciate the utility of simulated devices. In a manner similar to that described above, one could implement additional simulated devices, for example, a simulated trackball, a simulated 3-dimensional pointer, or a simulated joystick.

There are even advantages to a simulated tablet device. When one uses the present invention with a tablet that overlays the display screen, one particular correspondence between tablet data and screen data results in screen position tracking the location of the stylus (i.e., one set of X and Y scale factors and offsets). This correspondence will not generally be that used by any particular application, in which case stylus and screen positions will fail to track each other, presenting to the user a distraction not present when the tablet does not overlay the display screen. Thus, even when pointing is being generated by an actual tablet, there may be advantage in running an application with the simulated tablet device, rather than using the physical table directly.

Such a simulated tablet device would be similar to the simulated mouse device, except that absolute positions within the table area would be sent, instead of relative motion. Another difference between the simulated mouse and the tablet devices is that, for the tablet, it may be useful to include X and Y offset adjustments (i.e., to determine which portion of a complete tablet the tablet area is simulating) in addition to scaling.

2.7 Direct Tablet Input to Applications

There is a provision for making tablet data directly available to an application (not from the simulated tablet device, but from the actual tablet). Tablet data that is in the screen area, but not in a simulated device, is available to be sent to applications running in the main processor via the datalink protocol discussed above.

Tablet data sent to the application is scaled so that an application can easily relate tablet coordinates to screen positions. Tablet points in the button area are detected before the data is sent to the application; thus, functions buttons may continue to be active.

2.8 User Interface Called by an Application

Although the user interface subsystem is designed to be invisible to applications, applications that are designed to know about the user interface subsystem can obtain some additional benefits. Provisions can be made for an application to invoke user services provided by the user interface subsystem. An application running in the main processor can make a particular call, which causes the main processor to pass a code to the interface processor, identifying the service to be performed. For example, it is desirable for certain applications to be able to force certain simulated devices to appear and disappear at appropriate times.

Further, via datalink protocols by which the main processor can determine the current state of the simulated devices and by which the main processor can set the state of the simulated devices, a program for the main processor can save and restore simulated device configurations that the user finds particularly useful. This state information includes: contrast setting, position and size of each device icon, on/off state of each device icon, and various icon state values (e.g., numlock, mouse scale value, handwriting icon box size, keyboard configuration).

The ability to save user interface state permits the user to set the system so that, when it is started, particular devices are sized and located on the display according to the user's preferences. This also permits the user to quickly setup certain frequently used configurations.

2.9 Example of Main Processor Application Interaction with Interface Processor In a system in which Freestyle is the only application using tablet data, Freestyle can be invoked by the user touching the tablet with the stylus. However, when used with the simulated devices interface, as mentioned above, the Freestyle application can be started by touching a particular button area on the tablet. This can be accomplished by the following mechanism. When the system is initially booted, a resident portion of Freestyle is loaded on the main processor. At this time Freestyle, by means of a BIOS call, registers itself with the main processor BIOS as desiring to receive tablet data from the interface processor. Further, Freestyle communicates with the simulated devices interface (by means of BIOS calls that utilize the datalink to the interface processor) to indicate that tablet data should be sent after the Freestyle icon has been touched. Thus, when the simulated devices interface determines that the Freestyle button has been touched, it will then send tablet data, which will cause the resident portion of Freestyle to invoke Freestyle; the simulated devices interface could also invoke Freestyle by sending the appropriate keycodes to the main processor, such as simulating the simultaneous pressing of both shift keys (a key combination commonly used to invoke Freestyle). When Freestyle processing is completed, it communicates with the simulated devices interface indicating that no more tablet data should be sent to Freestyle until the button is again touched.

2.10 Simulated Devices Implementation

Figure 11:
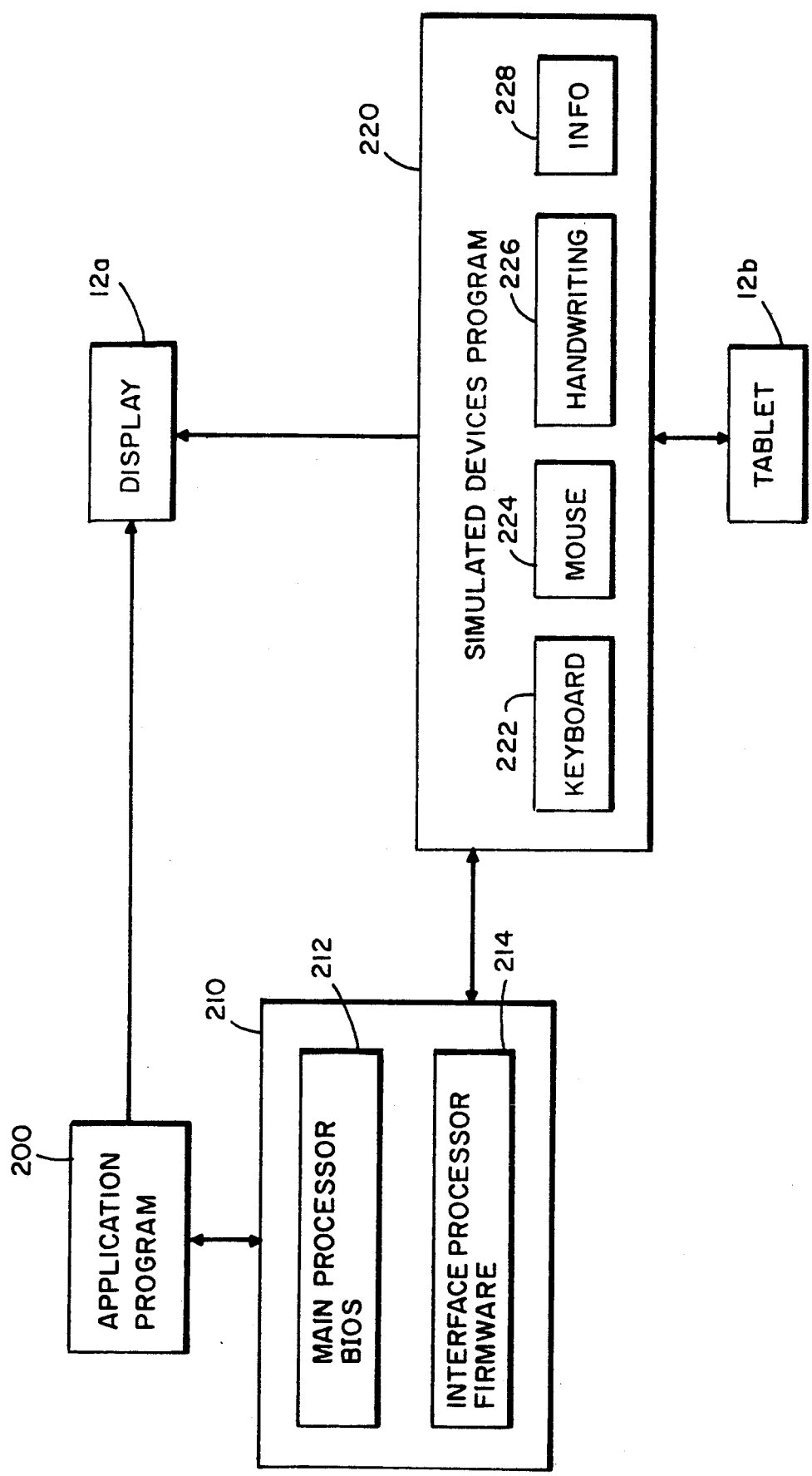
FIG. 11 illustrates relationships among the tablet, the display, and certain software components.

FIG. 11 illustrates relationships among the tablet 12b, the display 12a, and certain software components.

A user will interact with an application program 200 running in the main processor 30 (FIG. 2) by using the tablet 12b and the display screen 12a (which in the preferred embodiment are overlaid as shown at 12 in FIG. 1). Although block 200 is identified as "Application Program", it represents any program (including system programs) with which a user may wish to interact via the tablet and display.

The simulated devices described above are effected by a body of software 220 running in the interface processor and indicated in FIG. 11 as the "Simulated Devices Program". The simulated devices program includes components 222, 224, 226, and 228, which correspond to the various simulated devices. This body of software 220 uses the display 12a to provide visual feedback to the user by writing data to the ink and mask planes 42 and 44 (FIG. 2).

Data from the tablet 12b is processed by the simulated devices program 220, which, in response thereto, generates data, typically in the form of keystrokes or mouse data. This data is provided to the application program 200, by means of communication services 210 that include services provided by the main processor's BIOS 212 and services provided by the interface processor's firmware 214. Although not indicated in FIG. 11, low level interaction with the tablet is handled by routines in the interface processor's firmware; however, primary tablet control is effected by the simulated devices program.

The following outline illustrates the relationship among C functions in an illustrative embodiment of the simulated devices. The functions listed at one level in the outline are used to implement the function preceding them at the next outer level of the outline. Some of the flow control information is also included in the outline. One skilled in the art will appreciate and be capable of addressing the further details involved in implementing software components of a system such as described herein. The organization of the software described in the outline is illustrative, and one skilled in the art will appreciate that many variations are possible given characteristics of particular systems and differences in style among software developers.

The term "pen" is often used interchangeably with "stylus", as is the case in the following outline.

The digit preceding each item in the outline indicates the outline level of the item.

1 user_interface() this is the simulated devices user interface. Do forever:

- Wait for next point from tablet.

- Do nothing if it is not a pen-down point.

- If in function buttons, then do function button processing and then wait for pen up.

- If in a simulated device icon, then do the icon function (e.g., start_mouse_icon); icons are checked from top to bottom to see if the point is inside the icon's boundary.

- If down but not in any icon, then wait until pen up (to avoid motion into an icon).

- If up, or if down and not in any simulated device icon, optionally send the point to the main processor.

2 ttrpoint() get a point from the tablet; the tablet position is returned in two forms, one of which is in pixels and the other of which is at the tablet resolution (which is higher); the time of the tablet data is also returned. While the higher resolution coordinates are more suitable for operations such as handwriting recognition, pixel coordinates are more convenient for many screen-related operations. Rather than wait for a point from the tablet, this function will return an indication that data is not available.

2 check_button_boxes() do the function buttons (e.g., pull out the device tray):

- See if the cursor is in the function strip; if not, return.
- If in area of the "device" button, then select_devices().
- If "contrast" button, then adjust screen contrast.
- If "freestyle" button, then launch the freestyle application.
- If "info" button, then if info icon not already active, activate it, otherwise deactivate it (i.e., erase from screen and remove from icon stack).

3 if in "device tray button":
   4 select_devices() processing for the "devices" button; it alternates between two states: touching this button the first time activates the devices tray; touching the button a second time deactivates the devices tray.
      5 when changing from stamps to icons (put the device tray away):
         6 selection_done() this is done when the user has completed selection of devices from the tray; this removes the device tray from the display.
            7 erase_icons() clear all stamps and any icons from the display.
            7 erase_device_tray() remove the visual container for the stamps.
            7 remove_icon() remove any stamp from the icon stack that is located in the device box.
            7 swap_icons_and_stamps() the stamps remaining on the stack are exchanged for icons (on the icon stack).
            7 draw_icons() draw all icons and stamps on the icon stack (i.e., that are active). Performance may require only redrawing those icons that actually overlap, not just all icons that are logically underneath a moved icon.
      5 when changing from icons to stamps (pull out the device tray):
         6 erase_icons() get rid of the full-size icons.
         6 swap_icons_and_stamps() adjust the icon stack to have stamps instead of icons.
         6 draw_device_tray() draw the tray for available devices (in stamp form).

- 6 display_current_stamps() draw the stamps (MOUSESTAMP, KBDSTAMP, HANDWSTAMP).
    - 7 compute_stamp_position() stamp position is in the device tray for inactive icons, and at the icon position if the icon was active.
- 3 suck_touch_points() if the pen is in contact with the tablet, discard tablet data until the pen is lifted (optionally send points to main processor).
- 3 if in "contrast" button: adjust contrast of LCD display up or down depending upon which portion of the contrast button the stylus is touching.
- 3 if in "Freestyle" button: wake up Freestyle application in main processor.
- 3 if in "info" button:
    - 4 if info not active start it:
        - 5 add_icon()
        - 5 draw_info_icon()
    - 4 if info already active put it away:
        - 5 move_icon_to_top()
        - 5 erase_info_icon()
        - 5 remove_icon()

- 2 is_in_handw_icon()
    - 3 point_in_rectangle()

- 2 start_handw_icon() do the handwriting icon.
    - 3 move_icon_to_top() returns indication of whether the icon is already drawn on top; this is used to avoid redrawing for a drag or resize operation (or, in the case of the keyboard, a reconfigure operation, rather than resize operation), because these operations will display a shadow that will be changed in size or location instead of the full icon.
    - 3 is_in_writehandw()
    - 3 write_handw() handwrite and recognize characters. Called on first point of a stroke in handwriting area.
        - 4 capture_one_stroke() read points from tablet, until stylus is lifted; add all those points to a buffer of strokes.
        - 4 compute_stroke_box() determine the "box" for the most recently added stroke in the stroke buffer.
        - 4 flush_handw_strokes() if the new stroke is determined not actually to belong in the writing area (e.g., the writer touches down in the writing area, but moves out of the writing area), then perform recognition on any prior strokes in the buffer, throw this new stroke away, and return.

- compute_stroke_box_extents() if the new stroke is very wide (e.g., more than 3 character boxes wide), consider it to be an erase mark. Erase its ink. Convert the ASCII characters it covers to blanks. Throw the stroke away. Return.
- dump_previous_strokes() if this stroke is in a different "box" than the previous strokes in the stroke buffer, perform recognition on those prior strokes, throw them away, and make this new stroke the only buffered stroke. Note that stroke segmentation need not rely on actual boxes; "boxless" segmentation methods are available.
- check_timeout() wait until one of the following conditions occurs:
  - the user has not touched down for a timeout period.
  - the user has touched down, again; but not in the writing area.

In the preceding two cases, perform recognition on all buffered strokes, throw them away, and return.

- the user has touched down in the writing area. In this case, just return (the next iteration through a higher-level loop will call write_handw() again).

- is_in_draghandw()
- drag_handw()
  - drag_icon() drags the icon until the pen is lifted.
    - draw_handw_icon()

- is_in_sizehandw() Is the pen in the size area?
- resize_handw()
  - resize_icon()
    - draw_handw_icon()

- is_in_inserthandw() Is the pen in the insert area?
- insert_handw() insert blanks in the series of handwritten characters.
  - flush_handw() perform recognition on any pending buffered strokes, and throw them away.
  - set the cursor to a "tool modal" cursor to show the user that the insert mode is active.
  - suck_touch_points() wait for the user to lift the stylus.
  - suck_prox_points() wait for the user to touch down again.

- is_in_writehandw() if the user's touch is outside the writing area, set the cursor back and return.
- while the stylus is touching
    - if the user moves right from the initial position move the characters/boxes from the stylus point rightwards to the right end of the writing area, and fill in opened space with blanks.
    - if the user moves left from the initial position move the characters/boxes from the stylus point leftwards to the left end of the writing area, and fill in opened space with blanks.
- after the user lifts the stylus return (the user has created open space in which to write).
- is_in_deletehandw() Is the pen in the delete area?
- delete_handw() delete from the handwritten characters.
    - flush_handw() perform recognition on any pending buffered strokes, and throw them away.
    - set the cursor to a "tool modal" cursor to show the user that the delete mode is active.
    - suck_touch_points() wait for the user to lift the stylus.
    - suck_prox_points() wait for the user to touch down again.
    - is_in_writehandw() if the user's touch is outside the writing area, set the cursor back and return.
    - while the stylus is touching highlight all boxes/characters the user moves the stylus through.
    - after user lifts the stylus remove all boxes/characters the user highlighted; scroll characters/boxes from the right end of the writing area as needed to replace the deleted boxes.
- is_in_scrollleft() Is the pen in the scroll area?
- is_in_scrollright() Is the pen in the scroll area?
- scroll_handw() Scroll characters in handwriting area.
    - erase_handw_ink() Erase ink, eliminate buffered-up stroke points.
    - display_handw_prompt() Display scroll prompt.
    - initialize_repeat()
    - erase_writing_area()
    - draw_writing_area()
    - clear_handw_prompt()
    - wait_for_repeat() Before auto-repeating, wait the appropriate time interval.
    - is_prox() If pen is up, we are all done.

- - - - Use higher speed repeat Keep track of how often we have repeated; after 4 tries, start repeating the scrolling faster.
    - - - - - initialize_repeat()
- - - is_in_adjusthandw() Is the pen in the adjust area?
- - - adjust_handw() adjust the width of the boxes into which characters are written.
    - - - - erase_handw_ink() Erase ink, eliminate buffered-up stroke points.
    - - - - Highlight_Box() Highlight adjust box.
    - - - - display_handw_prompt() Put up prompt.
    - - - - Outline_Rectangle() Highlight rightmost box as a reference marker.
    - - - - Read points as long at the pen is down:
        - - - - - skip_to_current_tablet_data() Catch up with tablet.
        - - - - - ttrpoint()
        - - - - - is_prox() If pen is up, we are all-done.
        - - - - - compute new box width x movement of pen is the change in the total width of displayed boxes; width of one box is total / box_count. Do not go below a minimum size, or above a maximum.
        - - - - - Outline_Rectangle() Un-highlight rightmost box.
        - - - - - erase_writing_area()
        - - - - - compute_handw_location()
        - - - - - draw_writing_boxes() Redraw boxes.
        - - - - - Outline_Rectangle() Highlight new rightmost box.
    - - - - clear_handw_prompt()
    - - - - Highlight_Box()
    - - - - Outline_Rectangle()
    - - - - erase_handw_icon()
    - - - - draw_handw_icon()
- - - is_in_sendhandw() Is the pen in the send area?
- - - send_handw()
    - - - - display_handw_prompt()
    - - - - erase_handw_ink() Erase ink, eliminate buffered-up stroke points.
    - - - - Send all characters: only send those characters between the leading and trailing empty boxes; if the line was empty, send a carriage-return.
        - - - - - ascii_to_scan()
        - - - - - send_keycode()
            - - - - - - disable physical keyboard.
            - - - - - - send keycode data.
            - - - - - - enable physical keyboard.

4 Redisplay: reset the offset of the scroll window back so the 0'th box is displayed as the first box.
    5 draw_writing_area()
3 is_in_upperhandw() Is the pen in the upper-case area?
3 upper_handw() Determine the set of characters from which the recognizer will select (upper-case alphabetic).
  4 set_recognition_subset()

3 is_in_lowerhandw() Is the pen in the lower-case area?
3 lower_handw() Determine the set of characters from which the recognizer will select (lower-case alphabetic).
  4 set_recognition_subset()

3 is_in_numerhandw() Is the pen in the numeral-case area?
3 numer_handw() Determine the set of characters from which the recognizer will select (numerals and punctuation).
  4 set_recognition_subset()

3 suck_touch_points() Do nothing more until the pen is lifted.

2 is_in_mouse_icon()
  3 point_in_rectangle()

2 start_mouse_icon() do the mouse icon:

- Redraw on top unless in drag or size areas.
- Do function depending upon area (e.g., drag, size, buttons, motion).
- Wait until pen up.

3 move_icon_to_top() in addition to moving the icon to the top of the stack (but does not redraw the icon), it returns an indication of whether the icon is already drawn on top; this is used to avoid redrawing for a drag or resize operation (or, in the case of the keyboard, a reconfigure operation, rather than resize operation), because these operations will display a shadow that will be changed in size or location instead of the full icon.
3 is_in_dragmouse()
3 drag_mouse()
    4 drag_icon() drags the icon until the pen is lifted.
      5 draw_mouse_icon()

3 is_in_sizemouse()
3 resize_mouse()
    4 resize_icon()

- 5 draw_mouse_icon()

3 is_in_scalebar()

3 scale_mouse() pen movement in the x direction changes the tablet-to-mouse scale factor: scale length is changed by amount of pen movement in the x direction (and then forced within min and max limits); pixels-per-tick is computed as max-pixels-per-tick * (max-length − current-length)/max-length (and also forced within a min and max range).

- 4 display mouse scaling prompt
- 4 do for all pen down points:
    - 5 skip_to_current_tablet_data()
    - 5 ttrpoint()
    - 5 is_prox() break out of this loop when the pen is lifted.
    - 5 compute new values scale length and pixels per tick are each computed based on x movement.
    - 5 complement_scale_bar() erase the current scale bar.
    - 5 compute_mouse_location() update the mouse location parameters, including computing a scale length back from the pixels-per-tick.
    - 5 complement_scale_bar() draw new scale bar; scale bar grows towards the right (i.e., is left-justified within the space allotted for it).
- 4 clear_mouse_prompt()

3 is_in_leftbutton()

3 is_in_rightbutton()

3 is_in_bothbutton()

3 button_mouse() handle pen touch in any of the 3 button areas:

- An action on a button that is ON just turns that button OFF and returns.

- An action on a button that is OFF turns the button on and also checks for a click by calling timed_button_click(), which blocks until it is determined that the pen has been down long enough that this cannot be a click.

- Note the differences between pen action and comparable button action:

− A short button press is a click. A long button press is a long button press, that still ends when the button is released.

- A short pen touch is a click. A long pen touch leaves the simulated button locked down; a subsequent touch of any length releases the simulated button.

4 complement_leftbutton()

4 complement_rightbutton()

4 timed_button_click() if the button is not on, wait to see if time to pen lift is short enough to be considered a request for a click.

3 is_in_mouse_mouse()

3 mouse_mouse() handle the mouse motion portion of the mouse icon. Distance is computed (each time) in tablet points (more accurate than mouse ticks).

- display the mouse prompt.
- optionally, save a copy of the mouse icon.
- set old x & y ticks sent to 0.
- do until pen up:
  - skip old tablet data and then get next point.
  - measure from original touch to current location in mouse ticks.
  - compute ticks moved since touch down or since last move sent (subtract old x & y).
  - send mouse movement data as if from mouse.
  - set old x & Y to current location.

4 display mouse movement prompt

4 BitBlt_Pix_to_Mem() save a copy of the mouse icon. This function is only necessary in an implementation that does not use a hardware ink plane, in which case this function provides improved performance.

4 do for all pen down points:
  5 skip_to_current_tablet_data()
  5 ttrpoint()
  5 is_prox() break out of this loop when the pen is lifted.
  5 pen-to-mouse-tick algorithm convert from tablet distance to mouse ticks. To guarantee any path starting at one stylus position and returning to it will add up to total mouse motion of zero, scaling is done on tablet coordinates before conversion from absolute (tablet) to relative (mouse) motion.
  5 send mouse data to main processor.

4 clear_mouse_prompt()

- - - suck_touch_points()

- - is_in_kbd_icon()
  - - point_in_rectangle()

- - start_kbd_icon() do the keyboard icon.
  - - move_icon_to_top() returns indication of whether the icon is already drawn on top; this is used to avoid redrawing for a drag or resize operation (or, in the case of the keyboard, a reconfigure operation, rather than resize operation), because these operations will display a shadow that will be changed in size or location instead of the full icon.
  - - erase_kbd_icon()
  - - draw_kbd_icon()
  - - is_in_drag_section()
  - - drag_kbd()
  - - is_in_config_section()
  - - config_kbd_icon() configure the keyboard.
    - - - - save keyboard icon location so that the user can modify the configuration and not need to reposition the keyboard after making the modification.
    - - - - save_oldxys() save positions of the individual keyboard sections.
    - - - - remove_icon()
    - - - - init_kfig_editor()
    - - - - configure_kbd()
    - - - - restore keyboard X & Y location values.
    - - - - kbd_config_done() resize keyboard outline.
  - - is_in_vpfsection()
  - - is_in_hpfsection()
  - - is_in_kbdsection() determine whether the point is in the main keyboard section of the keyboard icon.
    - - - - point_in_rectangle()
  - - is_in_aksection()
  - - is_in_numsection()
  - - is_in_edtsection()
  - - find_key() determine keycode based on pen location in relevant portion of the keyboard icon. Given a point, return a key number:
    - In which major part of the keyboard is the point located (e.g., function keys, alphabetic keys, numeric keypad, cursor control)?

- Within the identified keyboard part, a binary search is used to determine in which row the point is located.

- Within the identified row, a binary search is used to identify the particular key.

The key number is then used as an index into a table that includes keycodes and key outlines.

3 type_key()
- 4 Fill_Rectangle() XOR key to show it is hit.
- 4 switch_to_scan() takes a key switch number and converts it to a make/break code pair from scancode set #2.
    - 5 scan2_to_scan1()
        - 6 convert_221()

- 4 for individual shift keys send a makecode or a breakcode, depending on the relevant shift state.
    - 5 send_a_code()

- 4 typematic() process non-shift keycodes, implementing accelerating typematic action.
    - 5 send_a_code()
- 4 Fill_Rectangle() unless the key is a locking key, complement the display of the key, again.

3 suck_touch_points()

2 is_in_info_icon()
  3 point_in_rectangle()

2 start_info_icon() do the info icon.
  3 Redraw icon (except for drag and re-size)
    - 4 move_icon_to_top()
    - 4 erase_info_icon()
    - 4 draw_info_icon()

3 is_in_draginfo() Is it in the drag area?
  3 drag_info()
  3 is_in_sizeinfo() Is it in the size area?
  3 resize_info()
  3 is_in_previous_info() Is it in the previous-help area?
  3 previous_info() Back down one level in the file stack, and bring up that info file.

₄ draw_info_text()

₃ is_in_scroll_up() Is it in the scroll up area?

₃ scroll_up_info() Scroll info text 1 line.

₄ wait_for_repeat() implement timed auto-repeat.

₃ is_in_scroll_down() Is it in the scroll down area?

₃ scroll_down_info() Scroll info text down 1 line.

₄ wait_for_repeat() implement timed auto-repeat.

₃ is_in_home_info() Is it in the home-info area?

₃ home_info() Go to the base of the info file stack.

₄ draw_info_text() Display that info file.

₃ is_in_info_info() Is it in the info-menu area?

₃ info_info() link to referenced info text. If the pen is not located in a current reference item, do nothing.

₄ for each current reference item:

₅ point_in_rectangle() Is the pen in the reference item?

₄ If reference is to the home file unstack everything.

₃ suck_touch_points()

₂ is_in_mouse_stamp()

₃ point_in_rectangle()

₂ is_in_kbd_stamp()

₃ point_in_rectangle()

₂ is_in_handw_stamp()

₃ point_in_rectangle()

₂ dev_drag_part() drag stamps.

₁ suck_touch_points()

The foregoing has described a specific embodiment of the invention. Additional variations will be apparent to those skilled in the art. For example, the particular embodiment described in detail is a portable computer with a tablet overlaying the display and provision for "electronic ink"; however, one skilled in the art will appreciate that the present invention is also useful in systems where the tablet (or other pointing device) is not used on the display, where a type of locator device other than a tablet is used, and in systems that are not intended to be portable. Thus, the invention is not limited to the specific details and illustrative example shown and described in this specification. Rather, it is the object of the appended claims to cover all such variations and modifications as come within the true spirit and scope of the invention.

We claim:

1. A computer system comprising:
   (A) a main processor for running pre-existing programs;
   (B) a display screen;
   (C) a main display buffer, coupled to the main processor, for receiving display data for a main display image generated by the pre-existing programs;
   (D) a pointer-type input device, including a stylus, which generates pointing data when a user of the system moves the stylus across the surface of the display screen;

(E) an overlay display buffer for receiving data for an overlay display image;

(F) a display multiplexer for receiving data from the main display buffer and from the overlay display buffer and for providing data to the display screen to generate a display that is a combination of the main display image and the overlay display image; and (G) an interface processor,
  (1) connected to provide keystroke data to the main processor,
  (2) connected to receive data from the pointer-type input device, and
  (3) connected to provide display data to the overlay display buffer,
for implementing at least one simulated device that a user of the system controls with the pointer-type input device and that is displayed to the user by means of the overlay display buffer.

2. The computer system of claim 1 wherein the at least one simulated device performs recognition of characters handwritten in an area of the device.

3. A computer system capable of running pre-existing keyboard-based programs from tablet input instead of a physical keyboard, comprising:

(A) a main processor for running the pre-existing programs, (B) a digitizing tablet and stylus, (C) a display screen, (D) a first display buffer, coupled to the main processor, for receiving display data from the pre-existing programs running on the main processor, (E) an interface processor, coupled between the digitizing tablet and stylus and the main processor, including means by which the interface processor can emulate a standard keyboard controller, (F) a second display buffer connected to receive display data from the interface processor, and (G) a display multiplexer for providing data to the display screen that is a combination of data from both the first and second display buffers, wherein the interface processor simulates a plurality of user input devices with input from the user by means of the digitizing tablet and feedback to the user by means of the second display buffer.

4. A computer system capable of running pre-existing mouse-based programs from tablet input instead of a physical mouse, comprising:

(A) a main processor for running the pre-existing programs, (B) a digitizing tablet and stylus, (C) a display screen, (D) a first display buffer, coupled to the main processor, for receiving display data from the pre-existing programs running on the main processor, (E) an interface processor, coupled between the digitizing tablet and stylus and the main processor, including means by which the interface processor can emulate a standard keyboard controller, (F) a second display buffer connected to receive display data from the interface processor, and (G) a display multiplexer for providing data to the display screen that is a combination of data from both the first and second display buffers, wherein the interface processor effects a simulated mouse device with input from the user by means of the digitizing tablet and feedback to the user by means of the second display buffer.

5. The system of claim 4, wherein the simulated mouse device includes display of a mouse icon which includes a mouse movement area and a mouse button area, corresponding to at least one mouse button, and the interface processor is responsive to tablet data in the mouse movement area to send mouse movement data to the main processor, and is responsive to tablet data in the mouse button area to send data to the main processor indicating action of the mouse button.

6. The system of claim 5 wherein the simulated mouse device further includes a second mouse button area, corresponding to a second mouse button, and a third mouse button area, and the interface processor is responsive to tablet data in the second mouse button area to send data to the main processor indicating action of the second mouse button and is responsive to tablet data in the third mouse button area to send data to the main processor indicating substantially simultaneous action of both mouse buttons.

* * * * *